US012720275B2

(12) United States Patent
Hashimoto

(10) Patent No.: US 12,720,275 B2
(45) Date of Patent: Aug. 25, 2026

(54) INFORMATION PROVIDING DEVICE, INFORMATION PROVIDING SYSTEM, INFORMATION PROVIDING METHOD, AND NON-TRANSITORY COMPUTER READABLE MEDIUM

(71) Applicant: NEC Corporation, Tokyo (JP)

(72) Inventor: Yuki Hashimoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 671 days.

(21) Appl. No.: 17/920,435

(22) PCT Filed: Apr. 23, 2021

(86) PCT No.: PCT/JP2021/016504
§ 371 (c)(1),
(2) Date: Apr. 14, 2023

(87) PCT Pub. No.: WO2021/220972
PCT Pub. Date: Nov. 4, 2021

(65) Prior Publication Data

US 2023/0262413 A1 Aug. 17, 2023

(30) Foreign Application Priority Data

Apr. 28, 2020 (JP) ................................. 2020-078945

(51) Int. Cl.
*H04W 4/021* (2018.01)
*H04W 4/02* (2018.01)
(Continued)

(52) U.S. Cl.
CPC ........... *H04W 4/021* (2013.01); *H04W 4/024* (2018.02); *H04W 4/026* (2013.01); *H04W 4/029* (2018.02)

(58) Field of Classification Search
CPC ..... H04W 4/021; H04W 4/029; H04W 4/022; H04W 4/024; H04W 4/026;
(Continued)

(56) References Cited

U.S. PATENT DOCUMENTS 8,588,818 B2 * 11/2013 Huang .................... H04W 4/02 455/456.3
9,858,739 B1 * 1/2018 Johnson .............. H04L 12/2816
(Continued)

FOREIGN PATENT DOCUMENTS

WO 2016/194117 A1 12/2016
WO 2019/012707 A1 1/2019
WO 2019/013008 A1 1/2019

OTHER PUBLICATIONS

International Search Report for PCT Application No. PCT/JP2021/016504, mailed on Jul. 20, 2021.

*Primary Examiner* — Lester G Kincaid
(74) *Attorney, Agent, or Firm* — Sughrue Mion, PLLC

(57) ABSTRACT

It is possible to appropriately provide information and services to a user who enters or exits a geofence. An information providing device includes a storage unit for storing area designation information for designating an area set on a route to a target, an angle threshold value, and content information about the target in association with each other, a position information acquisition unit for acquiring position information about a user terminal possessed by a user, a movement angle specifying unit configured to specify a movement angle indicating an angle at which the user enters or exits the area, by using the position information about the user terminal, an adjustment unit for adjusting the angle threshold value when a predetermined condition is satisfied, and a provision control unit for controlling provi-
(Continued)

sion of content information based on a result of comparison between the specified movement angle with the adjusted angle threshold value.

9 Claims, 22 Drawing Sheets

(51) Int. Cl.
*H04W 4/024* (2018.01)
*H04W 4/029* (2018.01)

(58) Field of Classification Search
CPC ..... G06Q 30/0261; H04L 43/16; H04L 67/52; H04L 67/535; H04L 67/54
See application file for complete search history.

(56) References Cited

U.S. PATENT DOCUMENTS

2002/0183072 A1* 12/2002 Steinbach ........... G06F 16/9537
707/E17.11
2010/0063726 A1* 3/2010 Marjenberg ........... G01C 21/20
701/408
2014/0287779 A1* 9/2014 O'Keefe ................. H04L 67/52
455/456.3
2015/0371270 A1* 12/2015 McDevitt .............. H04W 4/023
705/14.58
2018/0084381 A1 3/2018 Ohbitsu
2018/0121958 A1* 5/2018 Aist ...................... H04W 4/021
2019/0180540 A1* 6/2019 Usi .......................... G07C 9/20
2020/0145783 A1 5/2020 Hanada et al.
2020/0382898 A1* 12/2020 Onishi .................. H04W 4/027
2021/0158688 A1* 5/2021 Lau ...................... G07B 15/063

* cited by examiner

| TIME PERIOD | ADJUSTMENT VALUE |
|---|---|
| 0：00～7:00 | a |
| 7：00～11:00 | b |
| 11：00～16:00 | c |
| 16：00～20:00 | d |
| 20：00～24:00 | e |

Fig. 14

| PREVIOUS GEOFENCE | PRESENT GEOFENCE | CONTENT TYPE |
| --- | --- | --- |
| G1 | G3 | A |
| G2 | G3 | B |

Fig. 17

| OUTSIDE OR INSIDE RANGE OF ANGLE THRESHOLDS FOR PREVIOUS GEOFENCE | OUTSIDE OR INSIDE RANGE OF ANGLE THRESHOLDS FOR PRESENT GEOFENCE | CONTENT TYPE |
|---|---|---|
| OUTSIDE RANGE OF ANGLE THRESHOLD FOR G2 | INSIDE RANGE OF ANGLE THRESHOLDS FOR G3 | C |
| INSIDE RANGE OF ANGLE THRESHOLD FOR G2 | INSIDE RANGE OF ANGLE THRESHOLDS FOR G3 | D |

Fig. 19

INFORMATION PROVIDING DEVICE, INFORMATION PROVIDING SYSTEM, INFORMATION PROVIDING METHOD, AND NON-TRANSITORY COMPUTER READABLE MEDIUM

This application is a National Stage Entry of PCT/JP2021/016504 filed on Apr. 23, 2021, which claims priority from Japanese Patent Application 2020-078945 filed on Apr. 28, 2020, the contents of all of which are incorporated herein by reference, in their entirety.

TECHNICAL FIELD

The present disclosure relates to an information providing device, an information providing system, an information providing method, and a program.

BACKGROUND ART

In recent years, with the spread of communication devices such as smartphones, a service using position information called geofence has started. A geofence is an area surrounded by a virtual fence (boundary line) on a map. Such a geofence is set, and information about a store such as an advertisement or a coupon is provided from the store in the geofence to a user terminal possessed by a user entering the fence.

For example, Patent Literature 1 describes that a management server provides event information about a facility to a mobile terminal device in response to a supply from the mobile terminal device. Further, Patent Literature 1 describes that a geofence boundary line is dynamically created when the mobile terminal device moves along a route.

CITATION LIST

Patent Literature

Patent Literature 1: International Patent Publication No. WO2016/194117

SUMMARY OF INVENTION

Technical Problem

In related techniques, sometimes it is not possible to appropriately provide a service to a user terminal. Therefore, it is required to appropriately provide information and services to a user who enters or exits a geofence.

An object of the present disclosure is to provide an information providing device, an information providing system, an information providing method, and a program capable of appropriately providing information to a user who enters or exits an area.

Solution to Problem

In a first example aspect of the present disclosure, an information providing device includes:

storage means for storing area designation information for designating an area set on a route to a target, an angle threshold value which is an entry angle threshold value or an exit angle threshold value set in the area, and content information about the target in association with each other;

position information acquisition means for acquiring position information about a user terminal possessed by a user;

movement angle specifying means for specifying a movement angle indicating an angle at which the user enters or exits the area, by using the position information about the user terminal;

adjusting means for adjusting the angle threshold value when a predetermined condition is satisfied; and provision control means for controlling provision of content information based on a result of comparison between the specified movement angle with the adjusted angle threshold value.

In a second example aspect of the present disclosure, an information providing system includes:

storage means for storing area designation information for designating an area set on a route to a target, an angle threshold value which is an entry angle threshold value or an exit angle threshold value set in the area, and content information about the target in association with each other;

a user terminal possessed by a user;

position information acquisition means for acquiring position information about the user terminal;

movement angle specifying means for specifying a movement angle indicating an angle at which the user enters or exits the area, by using the position information about the user terminal;

adjusting means for adjusting the angle threshold value when a predetermined condition is satisfied; and provision control means for controlling provision of content information based on a result of comparison between the specified movement angle with the adjusted angle threshold value.

In a third example aspect of the present disclosure, an information providing method includes:

storing area designation information for designating an area set on a route to a target, an angle threshold value which is an entry angle threshold value or an exit angle threshold value set in the area, and content information about the target in association with each other;

acquiring position information about a user terminal possessed by a user;

specifying a movement angle indicating an angle at which the user enters or exits the area, by using the position information about the user terminal;

adjusting the angle threshold value when a predetermined condition is satisfied; and controlling provision of content information based on a result of comparison between the specified movement angle with the adjusted angle threshold value.

In a fourth example aspect of the present disclosure, a program for causing a computer to execute processing of:

storing area designation information for designating an area set on a route to a target, an angle threshold value which is an entry angle threshold value or an exit angle threshold value set in the area, and content information about the target in association with each other;

acquiring position information about a user terminal possessed by a user;

specifying a movement angle indicating an angle at which the user enters or exits the area, by using the position information about the user terminal;

adjusting the angle threshold value when a predetermined condition is satisfied; and controlling provision of content information based on a result of comparison between the specified movement angle with the adjusted angle threshold value.

Advantageous Effects of Invention

According to the present disclosure, it is possible to provide an information providing device, an information providing system, an information providing method, and a program capable of appropriately providing information to a user who enters or exits an area.

BRIEF DESCRIPTION OF DRAWINGS

FIG. 14 is a table showing adjustment values for each time period;

FIG. 17 shows an example of changing the type of content associated with the same geofence;

FIG. 19 shows an example of changing a type of a content associated with the same geofence;

EXAMPLE EMBODIMENT

First Example Embodiment

Example embodiments of the present disclosure will now be described with reference to the drawings.

Figure 1:
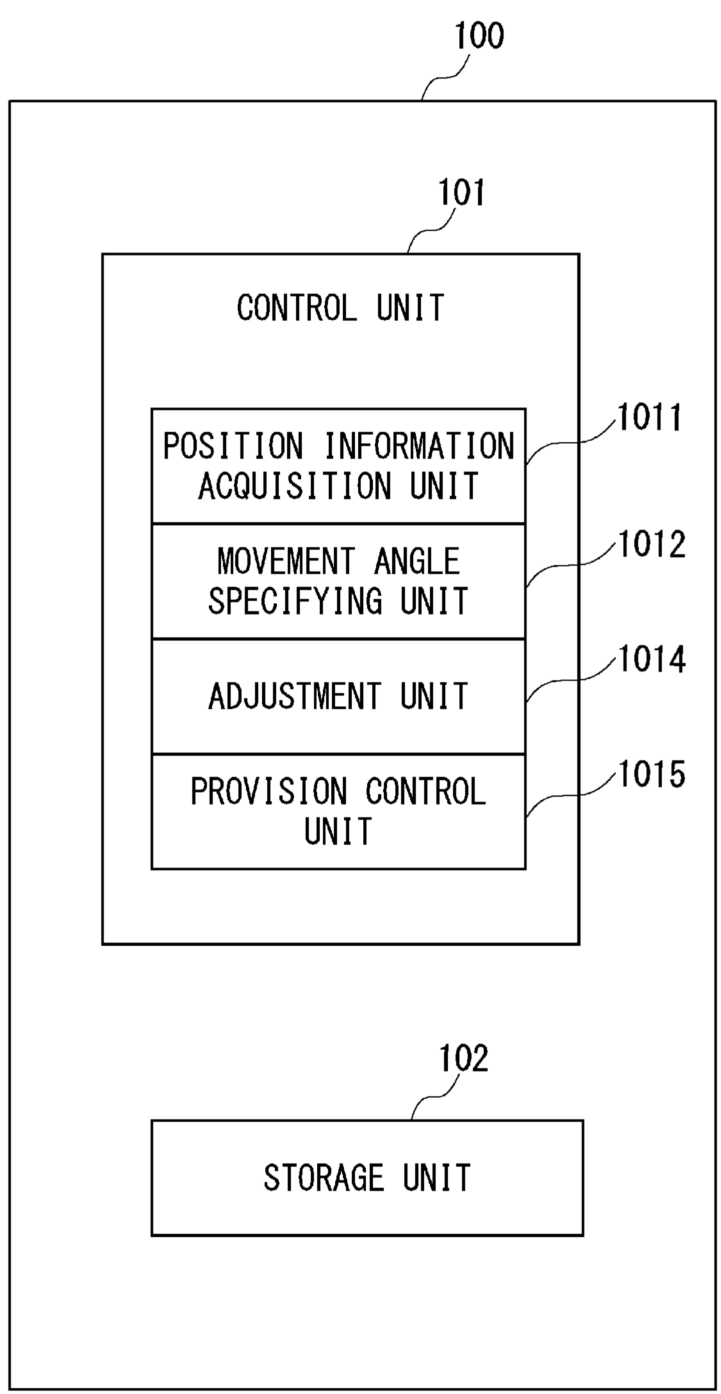
FIG. 1 is a diagram for explaining a configuration example of an information providing device according to a first example embodiment.

An information providing device according to this example embodiment will be described with reference to FIG. 1.

An information providing device 100 according to this example embodiment includes a control unit 101 and a storage unit 102. The information providing device 100 may be implemented by a computer including a processor such as a central processing unit (CPU), a memory, an interface circuit, etc. The storage unit 102 stores area designation information for designating an area set on a route to a target, an angle threshold which is an entry angle threshold value or an exit angle threshold value set in the area, and content information about the target in association with each other.

The target is not limited to buildings, facilities, or stores, but may include a variety of objects such as signs, advertising displays, mannequins, mascot dolls, animals, fireworks, and the like. The storage unit 102 stores position information (e.g., latitude and longitude) of the target. The route to the target is the route that a pedestrian passes to reach the target, and may include not only a route with a shortest estimated arrival time but also various routes that the pedestrian may pass. The area may be an area surrounded by a virtual fence (boundary line) provided on the map. The area designation information may include information specifying a latitude, a longitude, a size, a radius, etc., for designating an area on the map data. The angle threshold value may include an entry angle threshold value and an exit angle threshold value set in the area. The content information about the target can include information about signs, advertising displays, mannequins, mascot dolls, animals, fireworks, etc., event information about the facility, coupon information, directions (which are displayed on a display or provided through a voice service), traffic information (traffic jam and accident information), tourism information, video and acoustic AR (Augmented Reality), and the like.

The control unit 101 includes a position information acquisition unit 1011, a movement angle specifying unit 1012, an adjustment unit 1014, and a provision control unit 1015. The position information acquisition unit 1011 acquires position information about a user terminal possessed by a user. The movement angle specifying unit 1012 specifies a movement angle indicating an angle at which the user enters the area or an angle at which the user exits the area, by using the position information of the user terminal. The adjustment unit 1014 adjusts the angle threshold value when a predetermined condition is satisfied. The provision control unit 1015 controls the provision of the content information based on a result of comparison between the specified movement angle and the adjusted angle threshold value.

According to this example embodiment, the content information can be appropriately provided to a user who is moving in the area.

Second Example Embodiment

Figure 2:
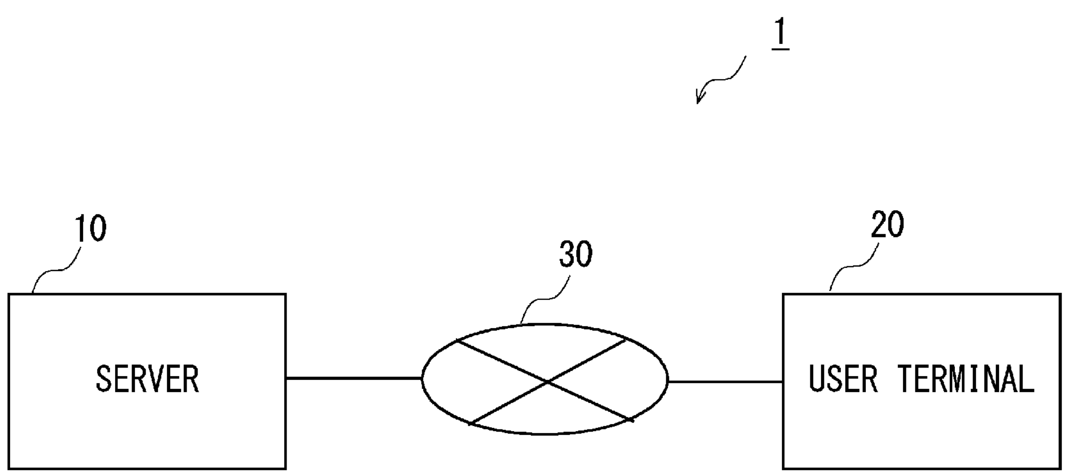
FIG. 2 is a diagram for explaining a configuration example of an information providing system according to a second example embodiment.

FIG. 2 is a diagram for explaining a configuration example of an information providing system.

An information providing system 1 includes a server 10 (sometimes called an information providing device) and a user terminal 20 connected to the server via a wired or wireless network 30. The network 30 may include a local area network (LAN) and a wide area network (WAN), such as the Internet, and a mobile communications network. The server 10 is an example of the information providing device according to the first example embodiment.

The server 10 provides the user who has entered the geofence with, for example, information about a specific target, facility, store or the like on a map (e.g., coupons, events, etc.), or a guidance service (sometimes referred to as a content service) that combines "video AR" with "acoustic AR". These targets are associated with predetermined geofences. The geofences may also be referred to herein simply as areas.

Figure 3:
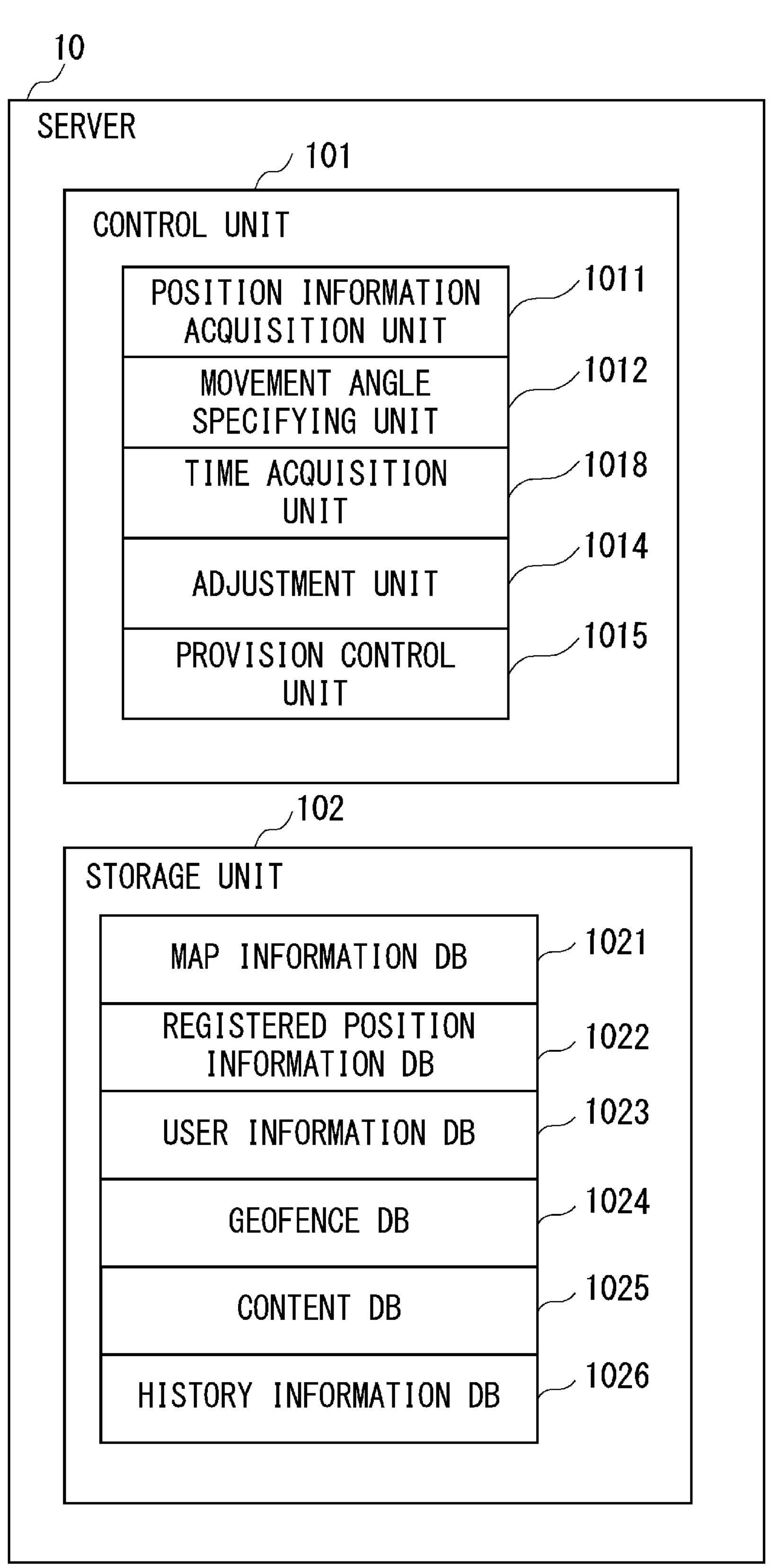
FIG. 3 is a diagram for explaining a configuration example of a server according to the second example embodiment.

FIG. 3 is a diagram for explaining a configuration example of the server.

The server 10 is a computer including a control unit 101 and a storage unit 102. The control unit 101 includes a processor such as a CPU (Central Processing Unit). Since the configuration of the control unit 101 is as shown in FIG. 1, it is not shown here. The storage unit 102 includes a map information database 1021, a registered position information database 1022, a user information database 1023, a geofence database 1024, and a content database 1025.

The map information database 1021 may include information such as road networks including roadways and sidewalks, branch points including intersections and T-junctions, traffic signals, traffic signs, various buildings, and facilities.

The registered position information database 1022 stores information about registered targets such as stores, buildings, museums, movie theaters, ruins, and tourist attractions. The registered position information database 1022 can store position information about various objects such as signs, advertising displays, mannequins, mascot dolls, animals, fireworks, etc. The person concerned with the facility registers such information in the information providing system 1 in advance, so that such information can be provided to the user terminal 20 of the user entering the geofence associated with the facility. Content data that combines information related to the registered position information with video AR and acoustic AR may be provided.

The user information database 1023 can include user information (user identification information) such as a user ID, a password, a terminal ID, an age, gender, a hobby, a preference, and the like of the user who wishes to receive the content information via the user terminal 20. The user information database 1023 may also include information about targets such as various objects including stores, buildings, museums, movie theaters, ruins, tourist attractions, signs, advertising displays, mannequins, mascot dolls, animals, and fireworks about which the user wishes to receive information. The user ID is an identifier that uniquely identifies the user. The terminal ID is an identifier that uniquely identifies the terminal.

The geofence database 1024 may include a geofence ID, a latitude, a longitude, a range, a size, an entry angle threshold value, and an exit angle threshold value of the set geofence in association with the registered position information described above. The geofence ID is an identifier that uniquely identifies the geofence. The entry angle threshold value and the exit angle threshold value are set as needed by a content provider. Each of the entry angle threshold value and exit angle threshold have an upper limit threshold value and a lower limit threshold value. In comparison with the actual entry angle and exit angle of the user with the entry angle threshold value and exit angle threshold value, respectively, if the actual entry angle and exit angle of the user are within the range of the threshold values, that is, within the range of the upper threshold value and the lower threshold value, the content is provided to the user. When the entry angle and the exit angle of the user are outside the range of the threshold values, that is, outside the range of the upper limit threshold value and the lower limit threshold value, the content is not provided to the user.

The content database 1025 can include the content information associated with the geofence ID and the user ID. The content information may be a content having the acoustic AR with a predetermined playback time, or may be content data with a predetermined playback time that combines the video AR with the acoustic AR. The length of such content, that is, the predetermined playback time can be set as needed in consideration of a walking speed of the user, a distance between the geofence and the store, and the like.

Further, the history information database 1026 can store the user terminal ID, the geofence ID, and the history information of providing the contents. The history information database 1026 can further store a provision time of the content information. The history information database 1026 is also referred to as a history information storage unit.

Although the storage unit 102 is provided inside the server 10 in the above example, the storage unit 102 may be provided outside the server 10. In this case, the present disclosure can also be implemented by a server connected via a network to a storage unit provided outside the server 10 within the information providing system.

The user terminal 20 is, for example, a computer that a user walking in a town can carry, and can be, for example, a portable terminal such as a smartphone, a wearable device, a smartphone watch, or a hearable device.

Figure 4:
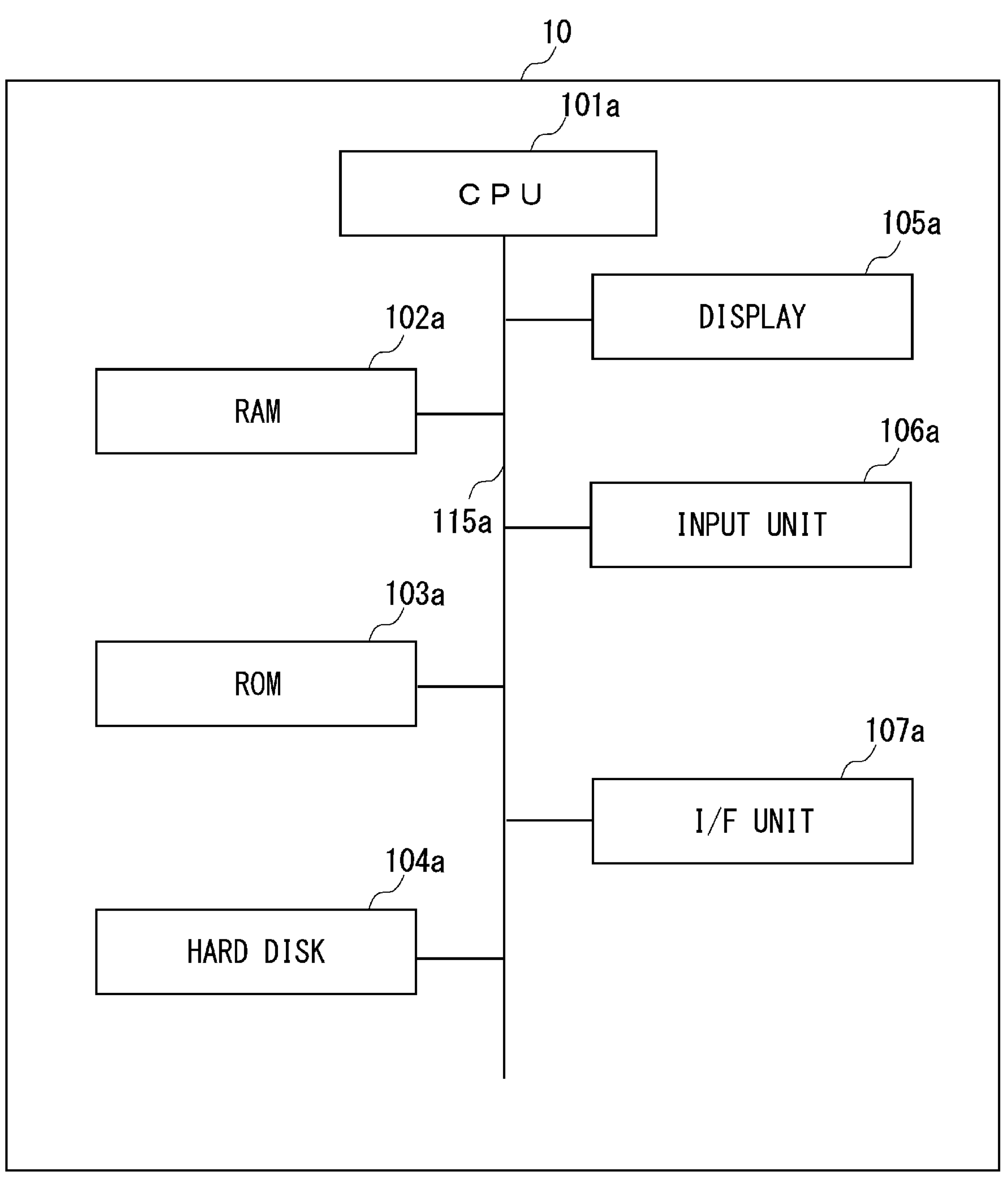
FIG. 4 shows an example of a hardware configuration of the server according to the second example embodiment.

FIG. 4 is a block diagram showing an example of a hardware configuration of the server 10 according to this example embodiment. As shown in FIG. 4, the server 10 is a computer (information processing device) having a CPU **101*a*, a RAM 102*a*, a ROM 103*a*, etc. The CPU 101*a* performs operation and control in accordance with software stored in the RAM 102*a*, the ROM 103*a*, or a hard disk 104*a* (the CPU is simply referred to as a processor). The RAM 102*a* is used as a temporary storage area when the CPU 101*a* executes various processes. The hard disk 104*a* stores an operating system (OS), a registration program, and the like. A display 105*a* includes a liquid crystal display and a graphic controller. Objects such as images and icons, and a GUI are displayed on the display 105*a*. The input unit 106*a* is a device for the user to give various instructions to the server 10, and includes, for example, a button, a keyboard, an on-screen keyboard, and a mouse. The I/F (interface) unit 107*a* can control wireless LAN communication and wired LAN communication complying with standards such as IEEE 802.11a, and communicates with external devices via the same communication network and the Internet based on protocols such as TCP/IP. A system bus 115*a* controls data exchange between the CPU 101*a*, the RAM 102*a*, the ROM 103*a*, and the hard disk 104*a***.

Figure 5:
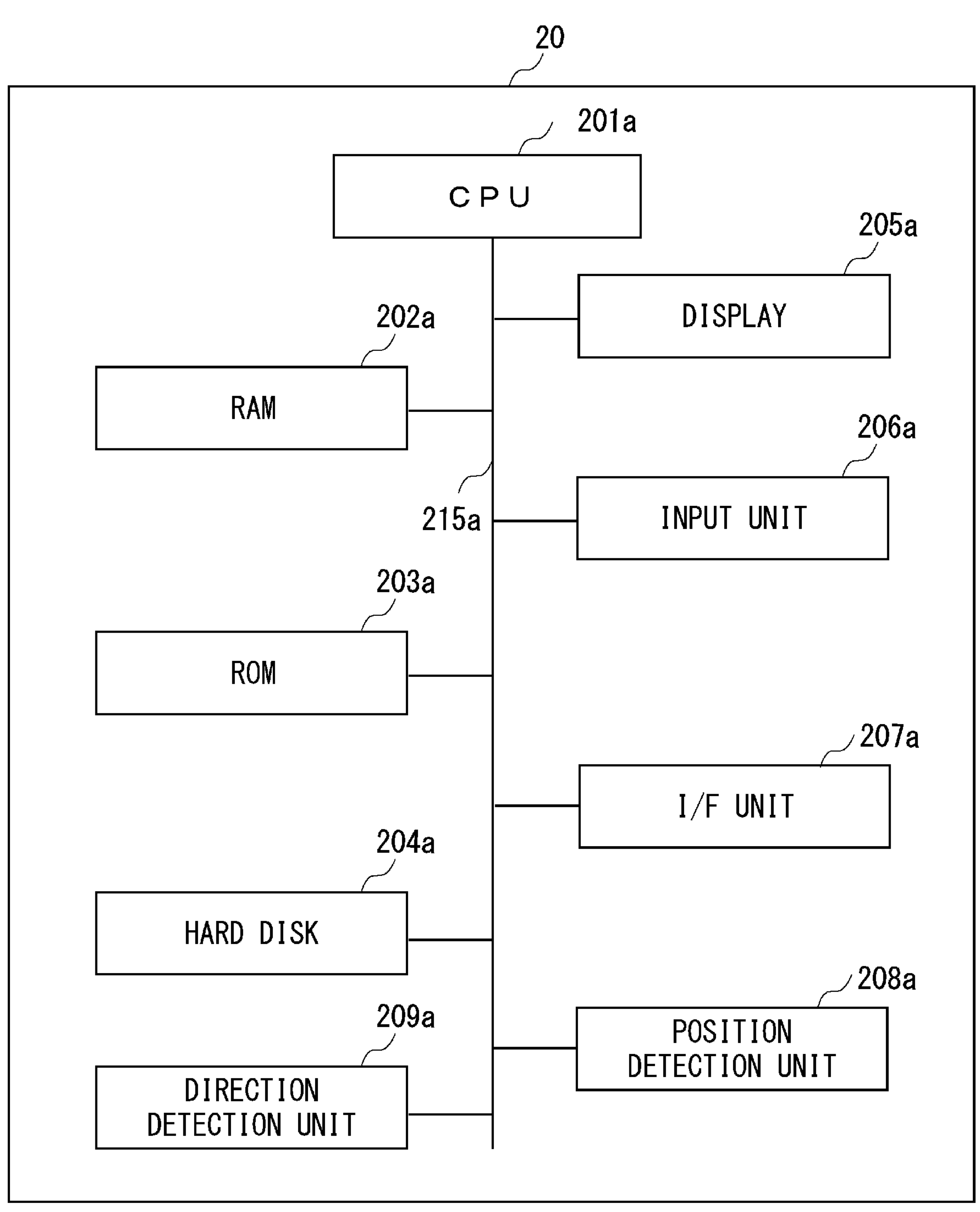
FIG. 5 shows an example of a hardware configuration of a user terminal according to the second example embodiment.

FIG. 5 is a block diagram showing an example of a hardware configuration of the user terminal 20 according to this example embodiment. As shown in FIG. 5, the user terminal 20 is a computer (information processing device) having a CPU **201*a*, a RAM 202*a*, a ROM 203*a*, etc. The CPU 201*a* performs operation and control in accordance with software stored in the RAM 202*a*, the ROM 203*a*, or the hard disk 204*a* (the CPU is simply referred to as a processor). The RAM 202*a* is used as a temporary storage area when the CPU 201*a* executes various processes. The hard disk 204*a* stores an operating system (OS), a registration program to be described later, and the like. A display 205*a* includes a liquid crystal display and a graphic controller. Objects such as images and icons, and a GUI are displayed on the display 205*a*. The input unit 206*a* is a device for the user to give various instructions to the user terminal 20, and includes, for example, a button, a keyboard, an on-screen keyboard, and a mouse. The I/F (interface) unit 207***a* can control wireless LAN communication and wired LAN communication complying with standards such as IEEE 802.11a, and communicates with external devices via the same communication network and the Internet based on protocols such as TCP/IP. A position detection unit 208*a* includes a GPS (Global Positioning System) receiver, and can detect a current position and a current time of the user terminal on the earth by receiving radio waves transmitted from an artificial satellite. A direction detection unit 209*a* includes a 9-axis sensor including a 3-axis acceleration sensor, a 3-axis gyro sensor, a 3-axis compass sensor, and the like for acquiring the direction of the user terminal. A system bus 215*a* controls data exchange between the CPU 201*a*, the RAM 202*a*, the ROM 203*a*, and the hard disk 204*a*.

In the hardware configuration example of the user terminal 20 described above, the display 205*a* for displaying video or image data such as video AR is included. However, in the case of a voice service for providing voice data such as acoustic AR, the display 205*a* may not be included. Further, in order to receive and listen to the voice service, an earphone, a headphone, a headset, a hearable device or the like connected to the I/F (interface) unit 207*a* of the user terminal by a wire or a radio may be used.

Next, a method for setting a geofence will be described in detail.

Figure 6:
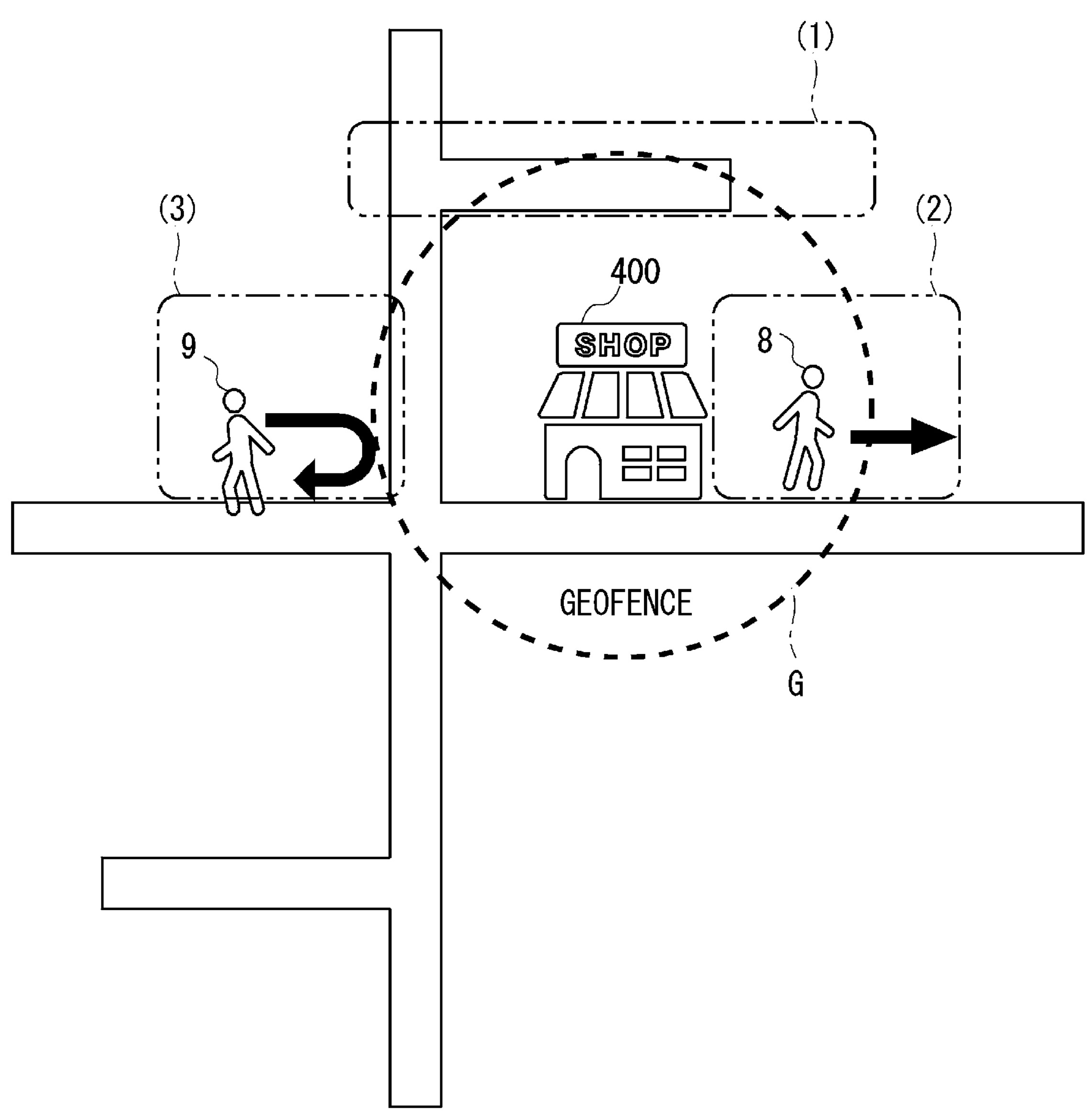
FIG. 6 shows a method for setting a geofence and its problems according to a comparative example.

FIG. 6 is a diagram for explaining the method for setting a geofence and its problems according to a comparative example.

Here, a geofence G is set for a facility 400 (e.g., a store).

In this comparative example, the circular geofence G is set around the facility 400. That is, an area having a predetermined radius around coordinates (latitude and longitude) of the facility 400 is set as the geofence. Thus, by inputting the latitude and longitude of the facility and the radius of the geofence into the information providing system, the geofence is easily set so that the facility is included in the geofence. When the position detection unit 208 (e.g., a GPS receiver) of the user terminal carried by the user detects that the user has entered the geofence G, information (e.g., coupons and event information) about the facility 400 is provided to the user terminal. However, in developing a service for providing voice data to the user terminal, the following three problems have arisen.

(1) If a part of the area of the geofence overlaps a road which is not on a moving line to the store, the voice service is inappropriately provided even to a user who should not be a target. It is difficult to set the radius of the geofence to avoid such false detection.

(2) The voice service is also inappropriately provided to a user 8 who is moving away from the store.

(3) The voice service is also inappropriately provided to a user 9 who suddenly changes his/her direction after entering the geofence.

In addition to the above problems, in particular, the service using GPS cannot avoid a measurement error (about 10 m) of GPS. Therefore, it is necessary to set the geofence in consideration of the measurement error so as to provide the information appropriately.

Figure 7:
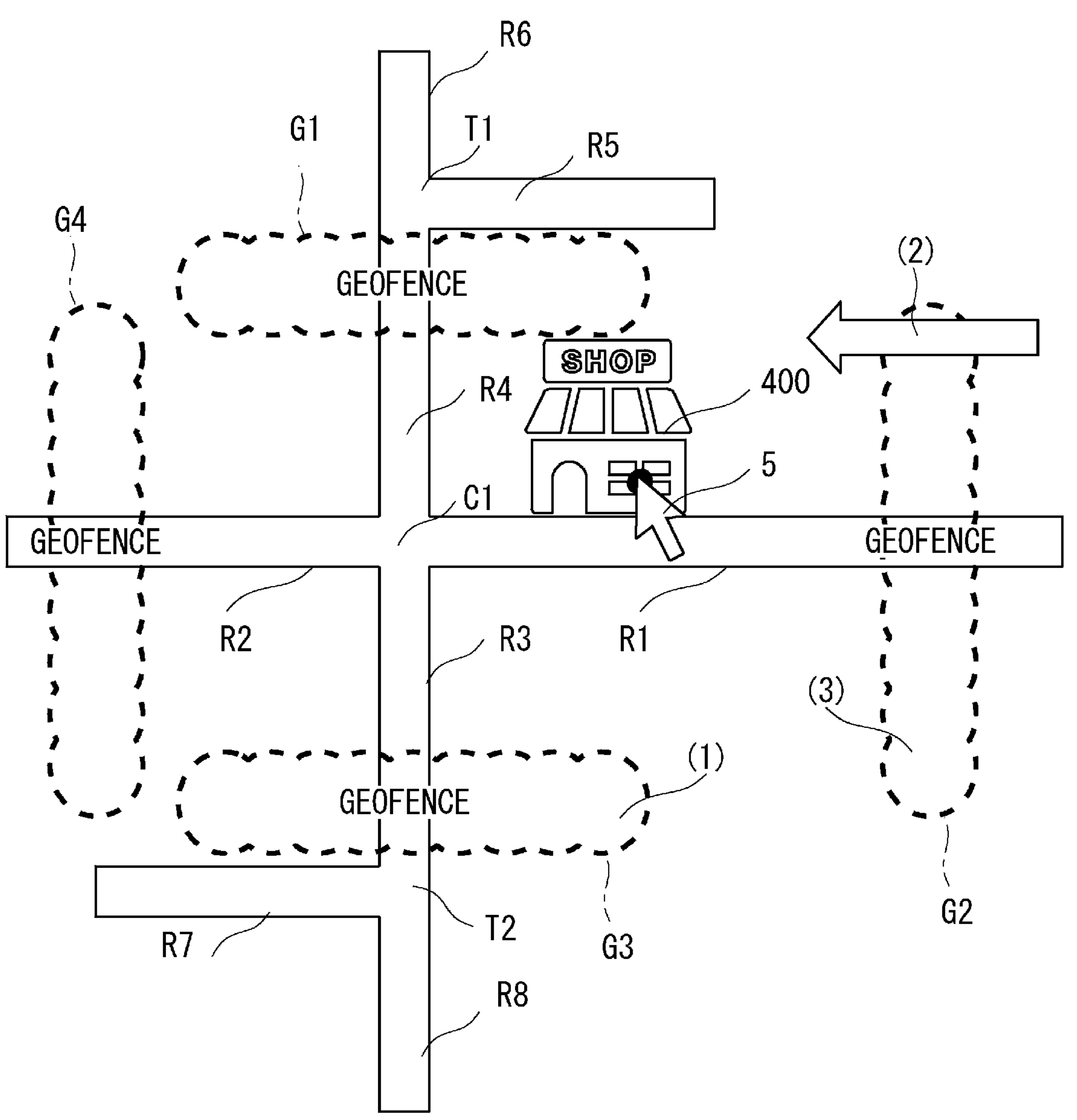
FIG. 7 shows a method for setting a geofence according to some example embodiments.

FIG. 7 is a diagram showing an example of a method for setting a geofence according to some example embodiments. In the voice service, when the user enters the geofence, the voice service (having a predetermined period of time) related to the store is provided to the user through the user terminal.

The solutions to the above three problems are as follows.

(1) Geofences G1, G2, G3 and G4 are arranged at positions separated by a predetermined distance from the store on moving lines for users to reach the store. In order to smoothly guide a user to the store, the user may arrive at the store almost at the same time as when the voice service for a predetermined period of time is finished.

(2) An entry direction to the geofence is set. By doing so, the voice service of the facility on the opposite side from the entry direction to the geofence is not provided. Thus, it is possible to prevent the voice service from being provided to a user who moves away from the store.

(3) In detection of an entry to the geofence, it is detected that the user has stayed in the geofence for a certain period of time, and then the voice service is provided. Thus, it is possible to prevent the voice service from being provided to a user who has suddenly changed his/her direction.

Hereinafter, a method for solving each problem will be specifically described.

Figure 8:
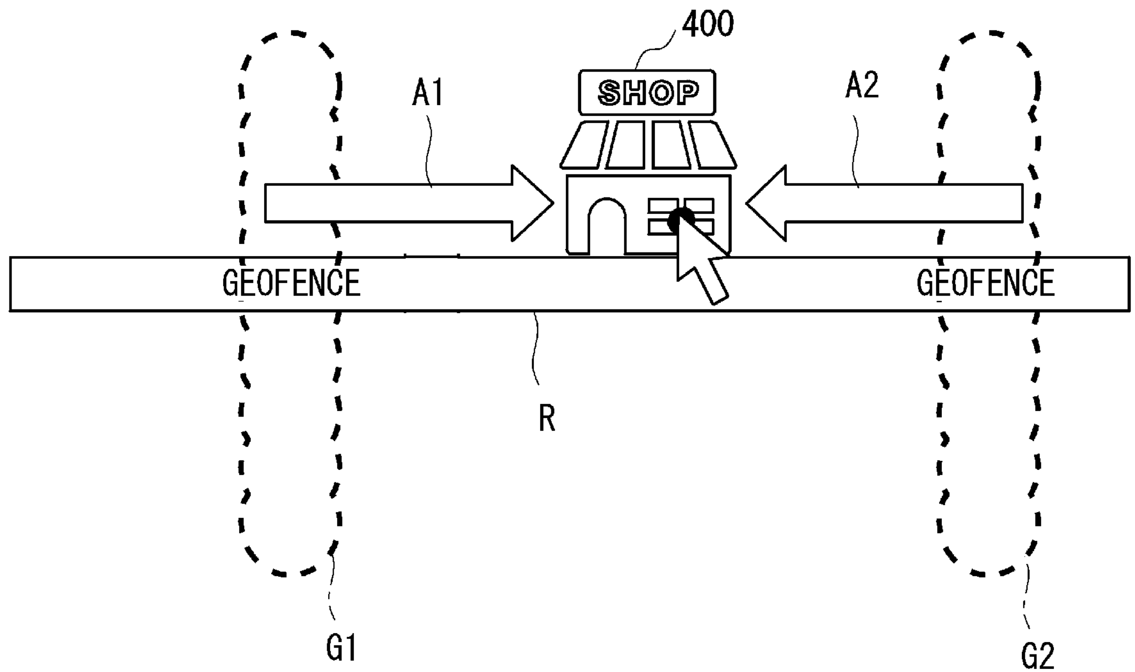
FIG. 8 shows a method for setting the geofence according to some example embodiments.

FIG. 8 shows an example in which the geofences G1 and G2 are set separated from the facility 400 by a predetermined distance.

As shown in FIG. 8, a single road R extends left and right in front of the facility 400. The two geofences G1 and G2 are set at positions separated by a predetermined distance from the store on the assumption that a customer of the store which is a user reaches the store through the road R. Arrows A1 and A2 in FIG. 8 schematically show a start and an end of voice services. When it is detected from the position information of the user terminal that the user has entered the geofence, the voice service is started, and the voice service is ended just when the user reaches the store according to the walking speed of the user. That is, the distance between the store and the geofence is set as needed in consideration of the predetermined period of time of the content such as the voice service and the walking speed of the user. The walking speed may be set in consideration of the age, gender, etc. of the user. The server 10 may dynamically change the distance between the facility (store) and the geofence by acquiring the user ID and the terminal ID in consideration of the age, gender, etc. of the user. The geofence may also be set so as not to overlap the facility.

As shown in FIG. 8, the geofences G1 and G2 are set so that they are elongated substantially vertically with respect to the road. This is because measurement errors due to GPS are taken into consideration. Although not shown, there are usually many buildings and tall buildings along the road. Therefore, it is considered that a deviation of the GPS due to the reflection at the building tends to increase in the direction vertical to the road.

The elongate shape of the geofence may be a suitable elongate shape, including a rectangle, an ellipse, or a combination of circles (described later in FIG. 8). In order to set a rectangular geofence, the coordinates of four points (latitude and longitude information) can be input.

In this example, a single road extending to the right and left from the store is assumed. However, if one of the right and left roads cannot be passed because it is a dead end or the like, the geofence can be set only on the road on the opposite side of the dead end road.

Figure 9:
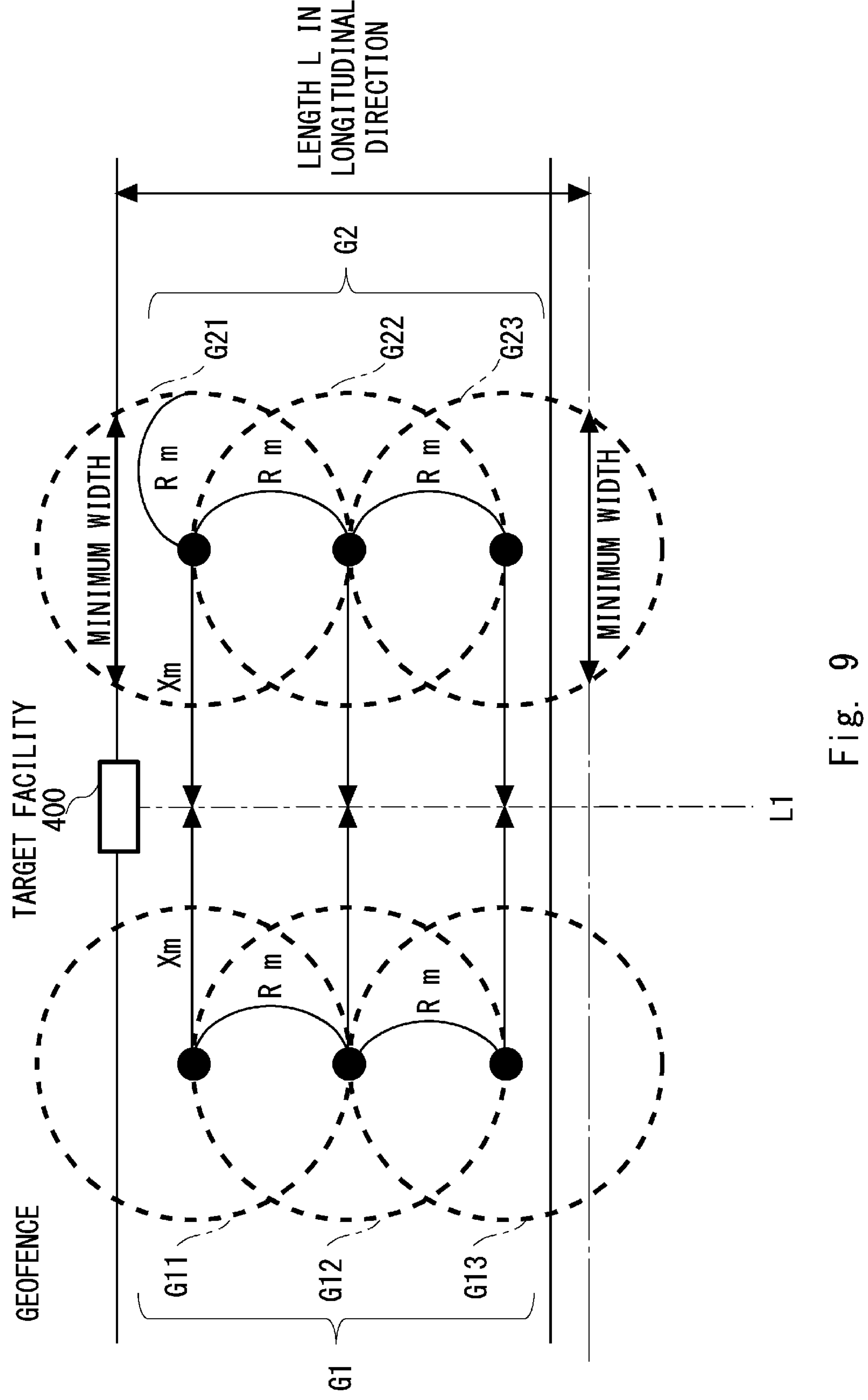
FIG. 9 is a diagram for explaining a method for setting a geofence according to some example embodiments.

FIG. 9 is a detailed view of an example of the elongated geofence. In FIG. 9, geofences are set assuming a single road as shown in FIG. 8.

A circular geofence G11 having a radius Rm is installed centering on a position Xm separated from a line L1 extending from a target facility 400 in a direction vertical to the line L1. A circular geofence G12 having a radius Rm, which overlaps the geofence G11 shifted by a predetermined radius Rm, is installed. Further, a circular geofence G13 having a radius Rm, which overlaps the geofence G12 shifted by Rm, is installed. Thus, a plurality of circular geofences G11, G12, G13 are grouped to form the elongated geofence G1.

Similarly, a plurality of circular geofences G21, G22, and G23 are installed opposite to the plurality of circular geofences G11, G12, G13 with respect to the line L1. That is, a circular geofence G21 having a radius Rm is installed centering on a position Xm separated from a line L1 extending from a target facility 400 in a direction vertical to the line L1. A circular geofence G22 having a radius Rm, which overlaps the geofence G21 shifted by a predetermined radius Rm, is installed. Further, a circular geofence G23 having a radius Rm, which overlaps the geofence G22 shifted by Rm, is installed. Thus, a plurality of circular geofences G21, G22, G23 are grouped to form the elongated geofence G2.

As described above, by using the elongated geofence, the content information can be appropriately provided to the user terminal even if a GPS error occurs.

Although three circular geofences are grouped as one geofence in FIG. 9, two or more circular geofences may be grouped in consideration of pedestrians moving lines and road widths.

In this example, the distance Xm from the facility 400 to the center of the circular geofence is about 15 m, and the radius of the circular geofence is about 3 m. Preferably, the overlap of adjacent circular geofences (in FIG. 9, a minimum width) is 4.5 m or more. The length L of the elongated geofence in the longitudinal direction shall be less than or equal to 10 m. The elongate geofences may extend from both ends of the road (or a walking area) at least as long as the road width (or width of the walking area). When the elongated geofence is rectangular, the length in the longitudinal direction may be 10 m or less and the width may be 4.5 m or more. Note that these are determined in consideration of the road width, the average walking speed of the pedestrians, the GPS measurement interval (approximately 1 second interval), the content time, and the like, and the present disclosure is not limited thereto.

As described above, for example, a predetermined distance for setting the area is determined based on the playback time length of the voice data. Therefore, when the playback time length of the voice data changes due to, for example, updating of the voice data stored in the content database of the storage unit 102, or addition or deletion of a part of the voice data, the control unit 101 may change the predetermined distance between the facility and the geofence accordingly.

In the above example, the single street in front of the store is assumed to be the walking area. However, regardless of the actual width of the road, an area (including a sidewalk) where pedestrians are expected to walk may be defined as a walking area, and a geofence may be set corresponding to the walking area. When an area where pedestrians (users) are expected to walk is wide, such as a theme park, a route connecting an entrance of the theme park to an entrance of a ride reserved by the user, may be defined as the walking area.

A length L of the elongate geofence in the longitudinal direction can be determined in consideration of the width of the walking area and the measurement error of the GPS. That is, the length L of the elongated geofence in the longitudinal direction may be extended from both ends of the width of the walking area by a predetermined width that allows measurement errors. In other words, if the GPS measurement error is 10 m, then the length L of the elongate geofence in the longitudinal direction has a length of 20 m in addition to the width of the walking area. The length L of the elongate geofence in the longitudinal direction may be extended from both ends of the width of the walking area toward both outsides by a measurement error of the GPS.

Figure 10:
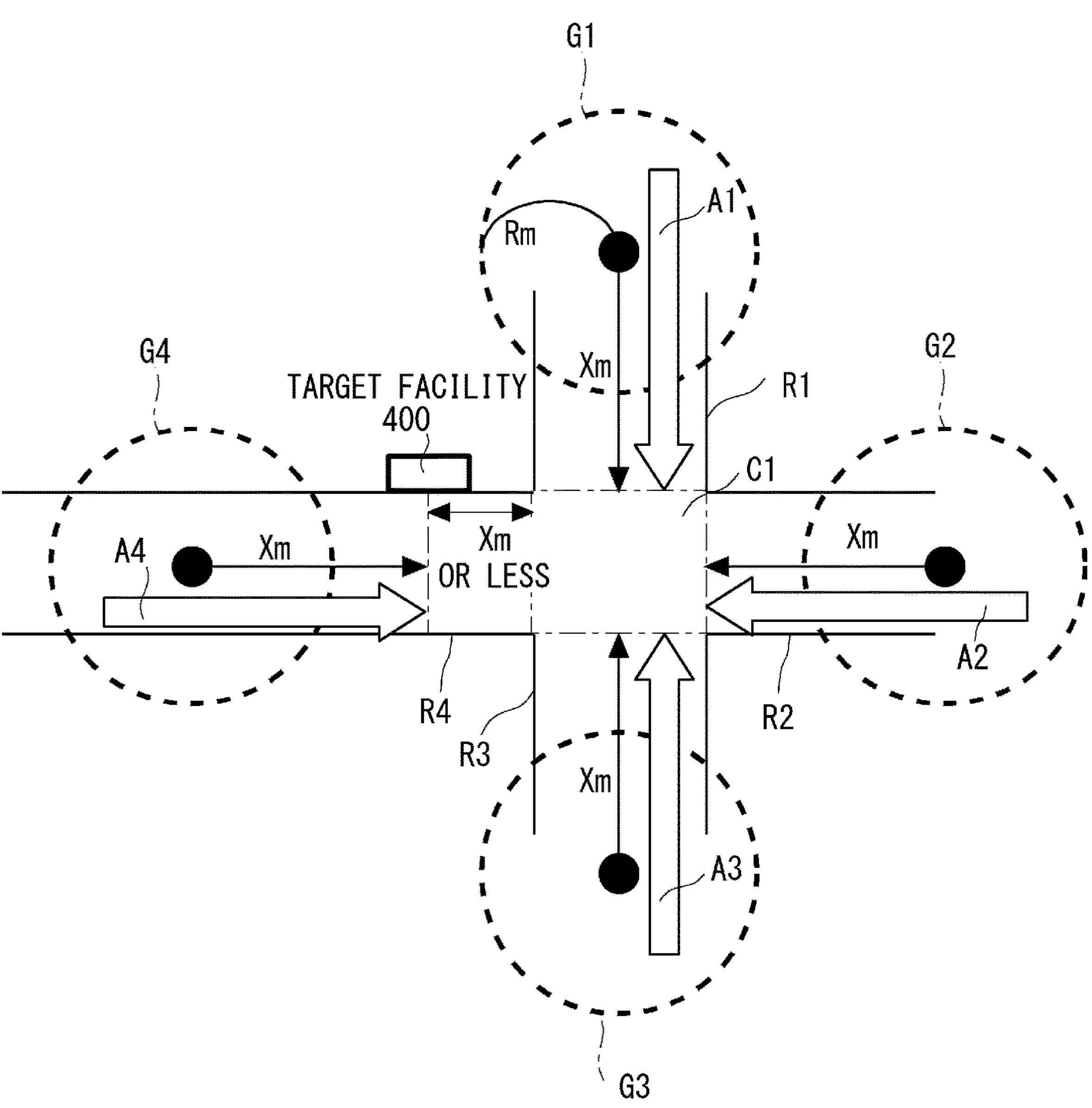
FIG. 10 is a diagram for explaining a method for setting a geofence according to the second example embodiment.

FIG. 10 shows an example in which geofences G1, G2, G3, and G4 are set in road networks R1, R2, R3, and R4 including an intersection C1 separated from the facility by a predetermined distance. Also in this example, as described above, the geofences are set at a position separated from the target facility 400 by a predetermined distance. However, when a facility is provided along the road R4 in the vicinity of a branch point such as an intersection or a T-junction (within a predetermined distance from the branch point), a geofence is provided on each of the branched roads R1, R2 and R3 (roads separated from the road where the facilities are located). That is, as shown in FIG. 10, when the facility 400 is at a predetermined distance Xm from the intersection C1, the geofence G2 is installed on the road R2 opposite to the facility 400 with respect to the intersection C1, the geofence G3 is installed on the road R3 on the right side of the intersection from the facility 400, and the geofence G1 is installed on the road R1 on the left side of the intersection from the facility 400.

That is, when the route to the facility is branched (such as an intersection or a T-junction), the geofences G1, G2, and G3 are set at positions separated by a predetermined distance (Xm) from right before the branch point. In other words, when there is a branch point between the target (facility) and a predetermined distance on the route, the geofence (area) may be set at a position on the route that is a second predetermined distance longer than the predetermined distance from the target. The second predetermined distance is set to be longer than the predetermined distance by a route passing through the branch point.

Arrows A1 to A4 in FIG. 10 indicate that a content such as a voice service is being played. As indicated by the arrows A1, A2, and A3, playback of the contents ends before the user who is approaching the facility 400 via the branch point enters the intersection C1. When a pedestrian walks on the road R4 where the facility is located, as indicated by the arrow A4, the playback of the content ends before the facility. In this way, by installing the geofence before the route to the facility is branched and ending the playback of the content related to the facility before the branch, it is possible to prevent unnecessary information from being provided to a user who does not surely move to the facility.

In the information providing system 1, as shown in FIG. 7, when the user moves a cursor 5 to the target facility 400 in map information displayed on the display and clicks a mouse, the geofence may be automatically set appropriately.

In FIG. 10, the circular geofences G1 to G4 are used for convenience of explanation, but as described above, it is possible to cover the measurement error of the GPS by forming the geofences G1 to G4 that are elongated substantially vertical to the road.

Next, a method for setting the entry direction to the geofence will be described with reference to FIG. 11.

Figure 11:
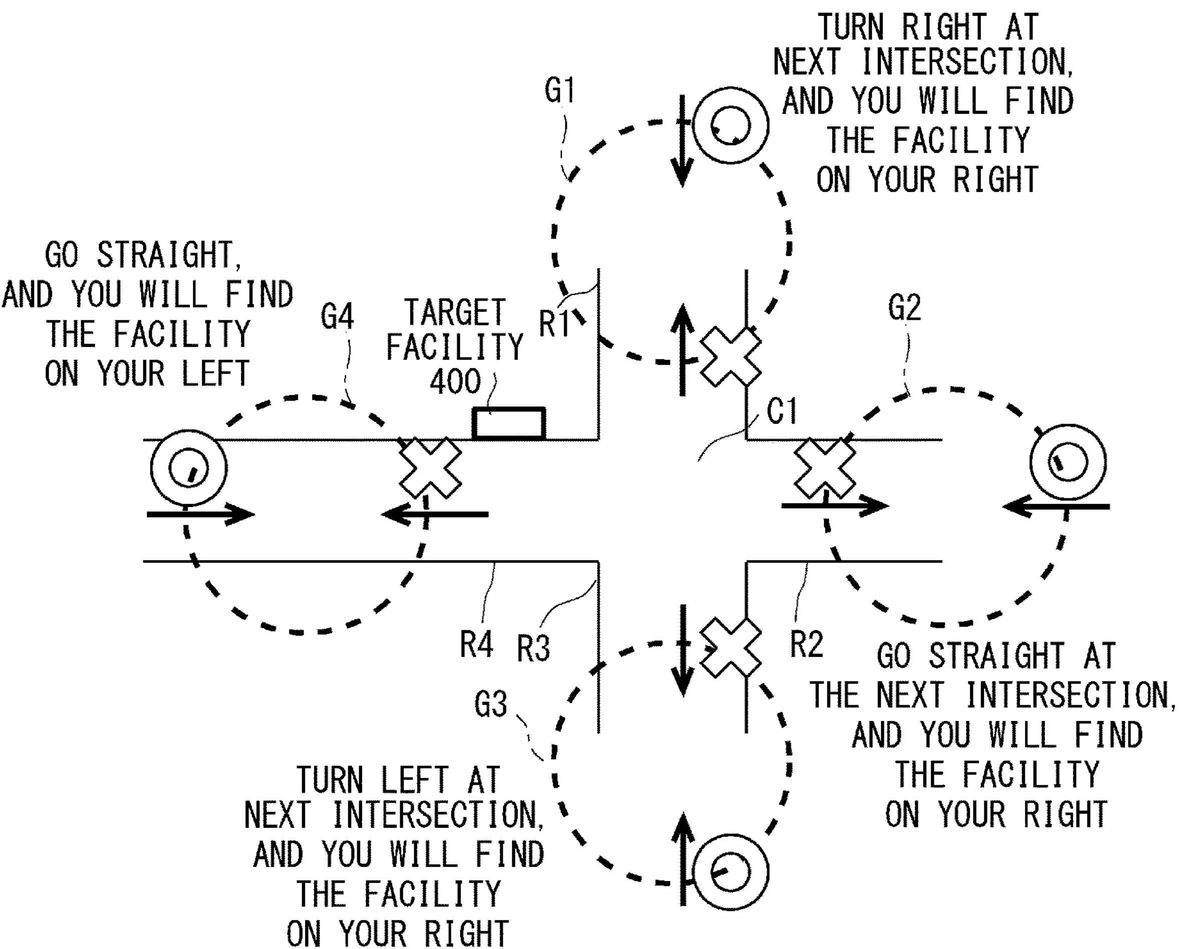
FIG. 11 shows a method for setting an entry direction to a geofence.

Although circular geofences are shown in FIG. 11 in order to simplify the drawing, elongated geofences extending from the road width may be used as described above.

As shown in FIG. 11, each of the geofences G1 to G4 defines the direction toward the facility 400 (i.e., the direction toward the intersection C1) as the entry direction (in FIG. 11, the directions toward the facility 400 are indicated by ○). Therefore, the voice service is provided to the user terminal for the user entering from the entry direction. The content of the voice service for the facility 400 may be determined differently for each geofence. For example, the voice service played when the user enters the geofence G1 may announce "Turn right at the next intersection, and you will find the facility on your right". The voice service played when the user enters the geofence G2 may announce "Go straight at the next intersection, and you will find the facility on your right". The voice service played when the user enters the geofence G3 may announce "Turn left at the next intersection, and you will find the facility on your right". In addition, the voice service that is played when the user enters the geofence G4 may announce, "Go straight, and you will find the facility on your left".

On the other hand, a direction away from the facility 400 (i.e., the direction away from the intersection C1) is defined as a non-entry direction (in FIG. 11, the direction away from the facility 400 is indicated by X), and no voice service is provided to a user who enters from the non-entry direction.

Figure 12:
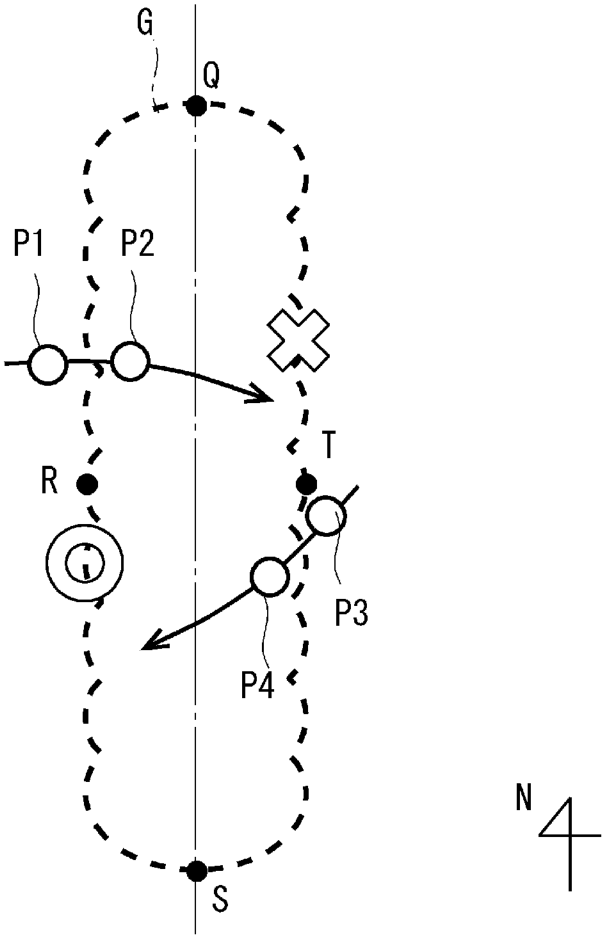
FIG. 12 is a diagram for explaining a method for identifying an entry direction to a geofence.

FIG. 12 is a diagram for explaining a method for identifying the direction in which the user enters the geofence.

In this information providing system, an interval at which the GPS measurement is performed is described as being about one second, but it may be set to any measurement interval.

The user who possesses a user terminal advances from a position P1 to a position P2 by GPS when entering a geofence G. In this case, an entry angle θ from the position P1 to the position P2 is calculated with reference to a predetermined direction (in this example, the north direction). If the calculated entry angle is within a range of the predetermined angle threshold values, for example, 180 degrees <θ<360 degrees, it can be assumed that the user has entered the geofence from an appropriate entry direction (indicated by ○ in FIG. 12).

On the other hand, it is assumed that the user who possesses the user terminal advances from a position P3 to a position P4 at the GPS measurement interval (about one second) when entering the geofence G. In this case, an entry angle θ from the position P3 to the position P4 is calculated with reference to a predetermined direction (in this example, the north direction). If the entry angle is within a range of the predetermined angle threshold values, for example, 0 degrees <θ<180 degrees, it can be assumed that that the user has entered the geofence from an inappropriate entry direction (which is a non-entry direction indicated by X in FIG. 12).

Alternatively, in a modified example, the entry direction of the user may be identified as follows. First, as shown in FIG. 12, a part QRS of the boundary line of the geofence G is defined as an entry boundary line, and a part QTS of the boundary line of the geofence G is defined as a non-entry boundary line.

When a user who possesses a user terminal enters the geofence G, it is assumed that the user advances from a position P1 to a position P2 at a GPS measurement interval (about one second). In this case, since the user has entered beyond the entry boundary line QRS of the geofence G, the control unit 101 can determine that the user has entered from the entry direction determined in advance for the geofence. In this case, the content information is provided.

On the other hand, it is assumed that the user who possesses the user terminal advances from a position P3 to a position P4 at the GPS measurement interval (about one second) when entering the geofence G. In this case, since the user has entered beyond the non-entry boundary line QTS of the geofence G, the control unit 101 can determine that the user has entered from the non-entry direction determined for the geofence G. In this case, the content information is not provided.

Figure 13:
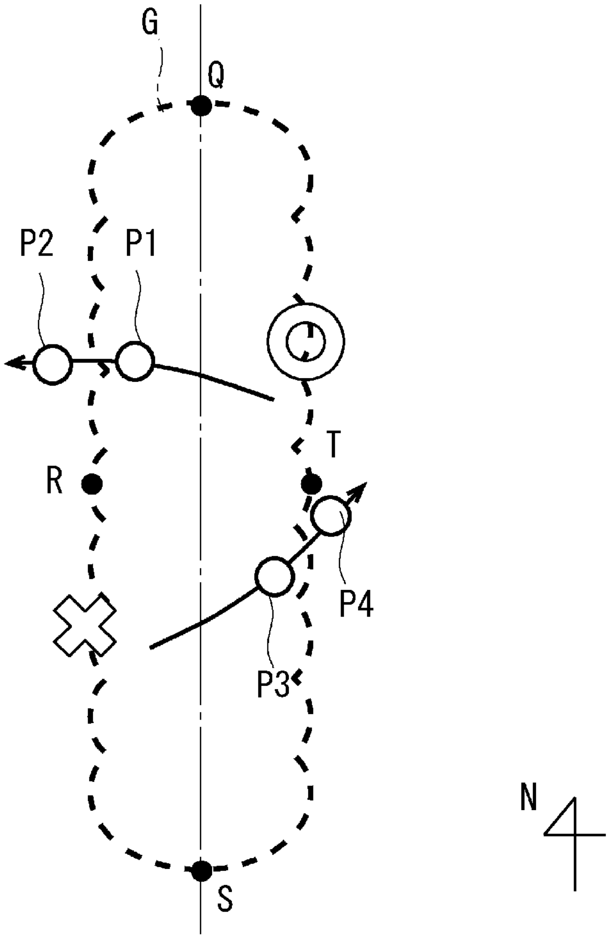
FIG. 13 is a diagram illustrating a method for identifying an exit direction from the geofence.

FIG. 13 is a diagram for explaining a method for identifying an exit direction of the user from the geofence.

Next, it is assumed that the user who possesses the user terminal advances from the position P1 to the position P2 by GPS when exiting the geofence G. An exit angle θ from the position P1 to the position P2 is calculated with reference to a predetermined direction (in this example, the north direction). If the calculated exit angle is outside a range of the predetermined exit angle threshold values (e.g., 180 degrees <θ<360 degrees), it can be assumed that the user has exited the geofence with an inappropriate exit direction (which is a non-exit direction indicated by X in FIG. 13). In this case, the content information is not provided.

On the other hand, it is assumed that the user who possesses the user terminal advances from the position P3 to the position P4 at a GPS measurement interval (about one second) when exiting the geofence G. In this case, the exit angle θ from the position P3 to the position P4 is calculated with reference to a predetermined direction (in this example, the north direction). If the exit angle is outside the range of the exit angle threshold values (e.g., 0 degrees <θ<180 degrees), it can be assumed that the user exits the geofence with the appropriate exit direction (indicated by ○ in FIG. 13). In this case, the content information is provided.

As described above, a content provider can set predetermined entry angle threshold values and exit angle threshold values for the geofence. The control unit 101 of the server 10 continuously receives the position information from the user terminal 20, calculates the entry angle to the geofence and the exit angle from the geofence, and can identify an appropriate entry direction and an appropriate exit direction. In this manner, the control unit 101 of the server 10 can provide appropriate content information to the user terminal 20.

In the above example, the entry direction is determined from two measurement values of two points at the measurement interval before and after the entry to the geofence, but the entry direction may be determined from two or more measurement points, for example, three or four points.

FIG. 14 is a table showing adjustment values for each time period.

As shown in FIG. 14, any adjustment value is set for each time period. The adjustment values (a to e in FIG. 14) can take any value. The adjustment value may be zero. The time acquisition unit 1018 of the control unit 101 acquires a time (e.g. 10:20) when the position information from the user terminal 20 indicates an entry to the geofence. The control unit 101 acquires the adjustment value (e.g., b) of the time period (e.g., 7:00 to 11:00) corresponding to the acquired time. The adjustment unit 1014 of the control unit 101 adjusts the entry angle threshold by multiplying the entry angle threshold value by the adjustment value. The degree of congestion of the roads where the geofences are set varies according to the time period. For example, in a situation where the user can walk relatively linearly (e.g., the road is not busy), the adjustment value may be set so as to narrow the range of the angle threshold values. On the other hand, in a situation where the user tends to walk in a zigzag line (e.g., the road is congested), the adjustment value may be set so as to increase the range of the angle threshold values.

In the above example, the entry angle threshold value is multiplied by the adjustment value, and instead the adjustment value (positive or negative values) may be added to the entry angle threshold value. The adjustment value may also be used for the exit angle threshold as well as for the entry angle threshold value. The adjustment value may be different for the entry angle threshold value and the exit angle threshold value.

The time periods shown in FIG. 14 are merely examples and can be set as needed.

As a modified example, the control unit 101 may acquire the accuracy of the GPS, and may perform control to increase the adjustment value for the angle threshold value if the accuracy of the GPS is less than an accuracy threshold value.

As another modified example, the control unit 101 of the server 10 may acquire the user's schedule from a calendar application of the user terminal 20, and change the adjustment value for the angle threshold value according to the acquired user's schedule. For example, if there is a plan in the schedule, the adjustment value may be increased.

If only the entry direction is identified, the voice service is inappropriately provided even to a user who suddenly changes his/her direction after entering the geofence. A solution to this problem will now be described.

Figure 15:
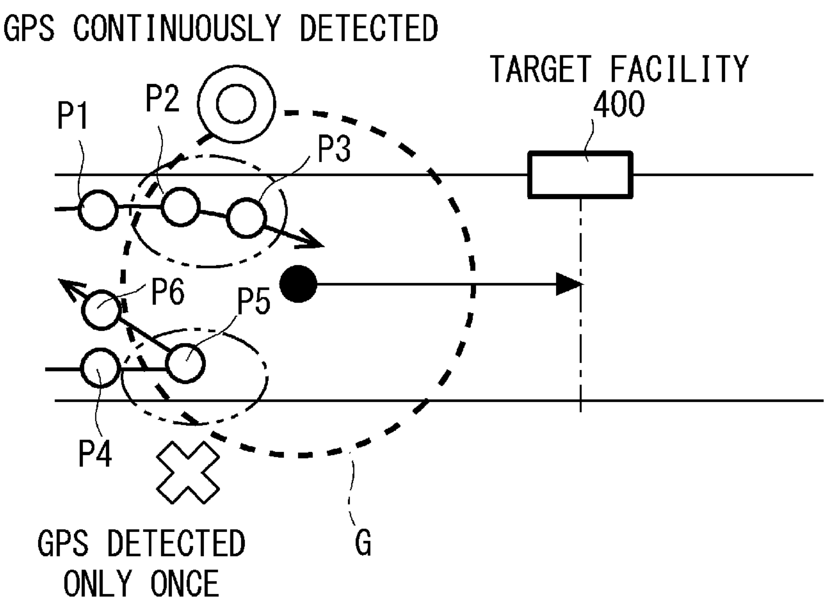
FIG. 15 is a diagram for explaining a method for identifying a movement direction after a user enters a geofence.

Referring to FIG. 15, a method for identifying the moving direction after the entry will be described.

After the control unit 101 detects that the user has entered the geofence from a predetermined entry direction, the control unit 101 further receives continuous GPS measurements (at least two measurements) over a GPS measurement interval. It is thus possible to determine the moving direction of the user after the user enters the geofence.

For example, as shown in FIG. 15, after the user's positions P1 and P2 are measured at GPS measurement intervals, if it is further detected that the next position P3 is inside the geofence G, the control unit 101 of the server 10 provides the voice service to the user terminal. In other words, if the user stays within the geofence G for a predetermined period of time (in this example, about 2 seconds) or longer, the control unit 101 of the server 10 provides the voice service.

On the other hand, after the position P4 and the position P5 of the user are measured by the GPS, if it is detected that the next position P6 is outside the geofence G, the control unit 101 of the server 10 does not provide the voice service to the user terminal. Thus, when the position of the user terminal is temporarily entered inside the geofence by mistake, the control unit 101 of the server 10 can prevent the content from being distributed to the user terminal.

In the above example, the measurement values of two points are measured to identify the moving direction after entry, but the content may be played after measuring three or more points in the geofence. The interval from immediately after the identification to the start time of the voice output can be appropriately adjusted according to the distance between the geofence and the target facility and the playback time of the content. As described above, the provision control unit 1015 may determine that the user has entered the area (geofence) after a predetermined period of time has elapsed after the user has entered the area. Alternatively, the provision control unit 1015 may determine that the user has entered the area (geofence) when the user has entered the region and then the user has advanced a predetermined distance further from the entry position on the boundary of the area.

Figure 16:
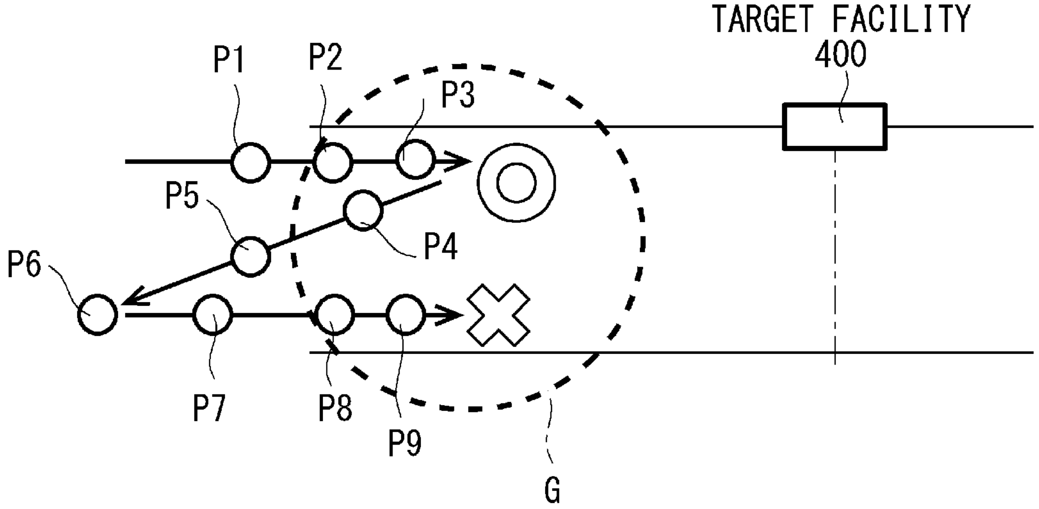
FIG. 16 is a diagram for explaining an example in which a content is not distributed when a user reenters a geofence.

Further, the content distributed once to the user who has entered the geofence may not be distributed to the user even if the user enters the geofence again. Specifically, as shown in FIG. 16, after a position P1 outside the geofence and positions P2 and P3 inside the geofence are measured, the content associated with the facility 400 is played. After that, it is assumed that the user moves to positions P5, P6, and P7 outside the geofence through a position P4 inside the geofence, and moves again to positions P8 and P9 inside the geofence. In this case, the information processing device can prevent the same content from being distributed again to the user who has been distributed the content once within a predetermined period of time.

The control unit 101 of the server 10 can store the provided content information in the history information database 1026 of the storage unit 102 as history information in association with user identification information and geofence identification information.

Specifically, a played flag is provided for the acoustic AR voice information (the content information). The information processing device (a user terminal or a server on the cloud side) sets a predetermined period of time (e.g., one hour) for a played flag in the acoustic AR sound information output by the user terminal. When the user enters the geofence, the information processing device checks the user ID or the terminal ID, and checks whether or not there is the flag of the acoustic AR voice information corresponding to the geofence ID. When the flag is present, the information processing device does not play the content for the user terminal, while when the flag is absent, the information processing device plays the content for the user terminal. As described above, the storage unit 102 further stores the history information about a user terminal group and whether information about the target is transmitted or not, and control unit 101 can transmit information about the target to the user terminal 20 based on the history information. The storage unit 102 further stores a transmission time of information about the target, and the control unit may transmit the information about the target based on the transmission time.

Furthermore, the provision control unit 1015 of the server 10 may change the type of the content associated with the same geofence based on the history information of the passage route of the user. In this case, the content is changed based on the history information of the passage route of the user indicating which route the user has passed regardless of whether the content is played or not.

The server 10 further includes the history information storage unit (the history information database 1026) for associating the identification information of the user terminal, the identification information of the plurality of areas, and the position information of the user terminal in the plurality of areas and storing them as the history information related to the passage route of the user, and the provision control unit 1015 changes the content information based on the history information. FIG. 17 shows an example of changing the type of the content associated with the same geofence. For example, as shown in FIG. 17, the provision control unit 1015 of the server 10 may provide a content A if the user enters the geofence G3 after passing through the geofence G1 in advance. On the other hand, the control unit 101 of the server 10 may provide a content B when the user enters the geofence G3 after passing the geofence G2 in advance. Thus, by storing the geofences passed in the past as the history information, the content service can be more flexibly provided to the user.

Furthermore, the provision control unit 1015 of the server 10 may change the type of the content associated with the same geofence based on the passage route of the user and the history information of the provided content.

The server 10 further includes a history information storage unit (the history information database 1026) for associating the identification information of the user terminal, the identification information of the plurality of areas, the position information of the user in the plurality of areas, and the content information provided for the plurality of areas and storing them as the history information about the passage route of the user and the provided content. The provision control unit 1015 changes the content information based on of the history information of the history information storage unit.

Figure 18:
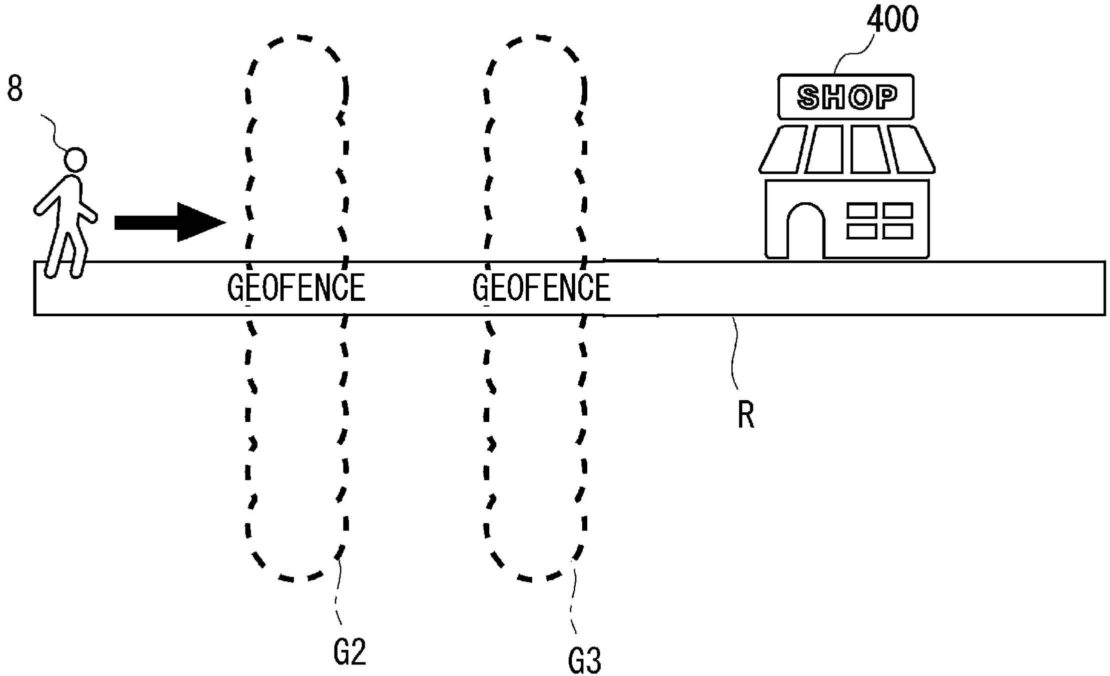
FIG. 18 illustrates an example of a plurality of geofences associated with a facility.

FIG. 18 is a diagram for explaining an example of a plurality of geofences associated with a facility. FIG. 19 is a diagram showing an example of changing the type of a content associated with the same geofence.

In FIG. 18, a plurality of geofences G2 and G3 are arranged at predetermined intervals on a route to the facility 400 for the user 8. For example, as shown in FIG. 19, the provision control unit 1015 of the server 10 may provide a content C if the user previously entered the geofence G2 outside the range of the angle threshold values and entered the geofence G3 within the range of the angle threshold values after the user passed the geofence G2 without providing the content associated with the geofence G2. On the other hand, the provision control unit 1015 of the server 10 may provide a content D when the user enters the geofence G2 within the range of the angle threshold values in advance, the content associated with the geofence G2 is provided, and the user enters the geofence G3 within the range of the angle threshold values after passing the geofence G2. For example, the content C can be a more substantial content related to the target as compared with the content D. Thus, by storing the geofence where the user has passed in the past and whether or not the content associated with the geofence is played as the history information, it is possible to more flexibly provide a content service to the user.

Third Example Embodiment

Figure 20:
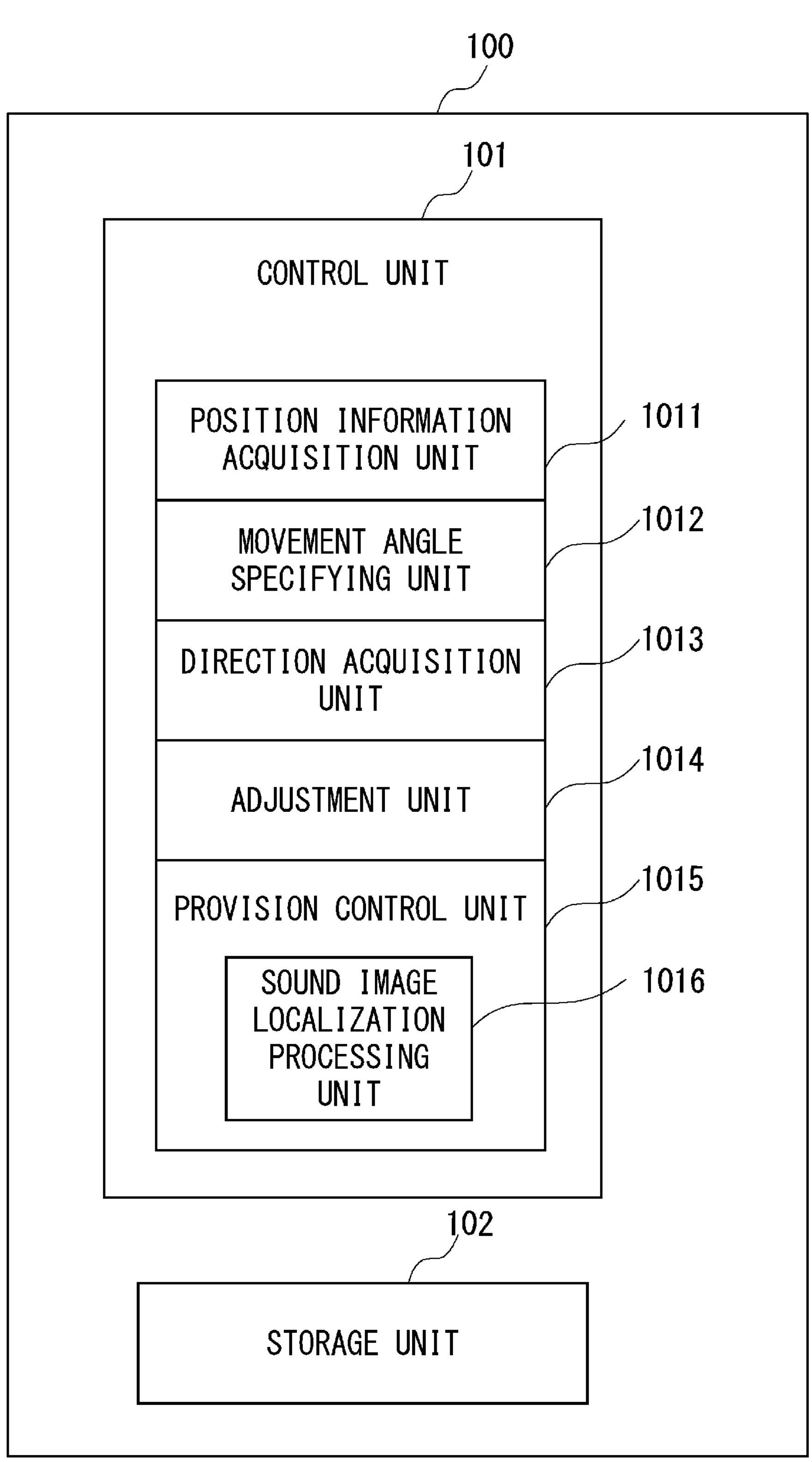
FIG. 20 is a diagram for explaining a configuration example of an information providing device according to the third example embodiment.

FIG. 20 is a diagram for explaining a configuration example of an information providing device according to a third example embodiment. In FIG. 20, the same components as those in the first example embodiment are indicated by the same reference signs as those in FIG. 1, and description thereof will be omitted as appropriate.

The control unit 101 according to the third example embodiment includes a direction acquisition unit 1013 for acquiring a direction of a user terminal. As described above, the user terminal 20 includes the direction detection unit 209*a*, and can periodically acquire the direction of the user terminal 20, and can transmit the acquired direction to the direction acquisition unit 1013 of the server 10. The control unit 101 can determine walking characteristic of the user from the transition of the direction of the user terminal acquired by the direction acquisition unit 1013 and the position information of the user terminal acquired by the position information acquisition unit 1011. For example, if it is determined that the user is walking in a substantially straight line, the adjustment unit 1014 may adjust the entry angle threshold value or the exit angle threshold value so that they become smaller. Alternatively, if it is determined that the user is walking while substantially walking in a zigzag line, the adjustment unit 1014 may adjust the entry angle threshold value or the exit angle threshold value so that they become larger. The provision control unit 1015 according to this example embodiment further includes a sound image localization processing unit 1016. The sound image localization processing unit 1016 performs sound image localization processing on the content information.

The direction acquisition unit 1013 can acquire the direction of the user terminal 20 when the user enters or exits the area. As described above, the user terminal 20 includes the direction detection unit 209*a* for detecting the direction of the user terminal, and that can periodically acquire the direction of the user terminal 20, and can transmit the acquired direction to the direction acquisition unit 1013 of the server 10.

The provision control unit 1015 controls the provision of the content information based on the obtained direction of the user terminal and the result of comparing the specified movement angle with the adjusted angle threshold value. For example, even if the entry angle when the user enters the geofence is within the range of the entry angle threshold values, if the direction of the user terminal 20 is different from the traveling direction, the voice information for which the sound image localization processing is not performed by the sound image localization processing unit 1016 may be output, or the provision control unit 1015 may not provide the content itself. In particular, when a hearable device attachable to the user's head is used as the user terminal, the orientation of the user's face can also be acquired. The provision control unit 1015 may not provide the content when the user's face is looking down, or when the user is looking straight ahead, which is different from the traveling direction.

The sound image localization processing unit 1016 of the provision control unit 1015 performs sound image localization processing on the voice content to be output in accordance with the position of the target and posture information of the user (i.e., the direction of the user terminal). The sound image localization processing performed by the acoustic AR generates voice information localized at the position of the virtual sound source as voice information for the right ear and voice information for the left ear, and by listening to these voice information, the user can realize a virtual feeling of hearing the sound from the position of the virtual sound source. In the sound image localization, a distance from the virtual sound source and an azimuth of the user to the virtual sound source are acquired, and sound image localization processing is performed on the sound content based on the information. The distance between the virtual sound source and the user can be calculated based on the position of the virtual sound source and the latitude and longitude information of the position of the user. The azimuth of the user to the virtual sound source can be calculated based on the movement angle and the position information of the virtual sound source. The virtual sound source position may be the same as the target position information indicating the target position. Further, in the case of realizing the bodily sensation of listening to an utterance of an object located in the vicinity or an utterance of the virtual girlfriend, the position may correspond to the object or the virtual object provided in the vicinity of the user. Thus, the voice information with the sound image localization can be heard according to the direction of the user's head when the user enters the geofence, so that even if the entry angle to the geofence varies within the range of the entry angle threshold values, the sound information can be heard as the sound information from a predetermined position.

Other Example Embodiments

Figure 21:
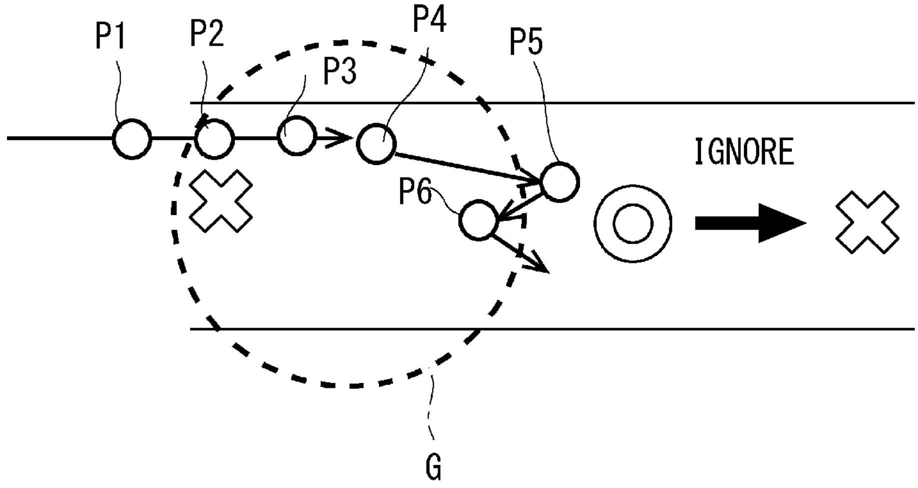
FIG. 21 is a diagram for explaining a problem with a user exiting through a geofence.

FIG. 21 is a diagram for explaining a problem when a user passes through a geofence and exits.

When a user enters a geofence G from outside the range of the entry angle threshold values set for the geofence G, the provision control unit 1015 does not provide the content information. When the user advances the geofence G and exits the inside of the geofence to the outside, a failure due to erroneous detection occurs. For example, when a user stops by a signal or the like in the vicinity of an exit position of the geofence (e.g., the position P5 of FIG. 21), the position information of the user terminal is regarded that the user has entered the geofence within the range of the entry angle threshold values due to an GPS error or the user's wobble, and the content information is unnecessarily provided to the user. In order to eliminate such erroneous detection, even when the user enters the geofence from outside the range of the angle threshold values and enters again within the range of the angle threshold values, the provision control unit 1015 does not provide the content within a predetermined period of time from the first entry. The predetermined period of time can be set as needed in consideration of the average walking speed of the user and the size of the geofence. In this way, the provision control unit 1015 can ignore the case shown in FIG. 21 within a predetermined period of time.

Figure 22:
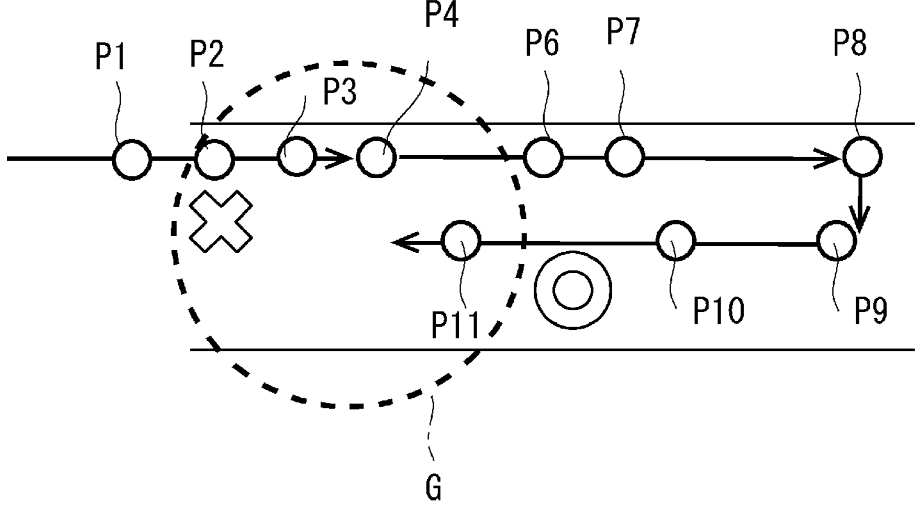
FIG. 22 is a diagram for explaining a method for coping when a user passes through a geofence and exits.

FIG. 22 is a diagram for explaining a countermeasure when a user passes the geofence.

If the user's position is detected at a plurality of positions (e.g., P6, P7, and P8) outside the geofence after the user exits the geofence, the provision control unit 1015 may determine that the user has exited the geofence. The provision control unit 1015 may then provide content when the user changes his/her direction and continues to walk and again enters the geofence within the range of the entry angle threshold values (a position P11 in FIG. 22). As described above, the provision control unit 1015 may determine that the user has exited the area (geofence) after a predetermined period of time has elapsed after the user has exited the area. Alternatively, the provision control unit 1015 may determine that the user has exited the area (geofence) when the user has exited the area and then the user has advanced a predetermined distance beyond the exit position on the boundary of the area.

Further, the present disclosure may also take the form of an information providing method, as described above with respect to the procedure of processing in the information providing device in the various example embodiments described above. The information providing method includes: storing area designation information for designating an area set on a route to a target, an angle threshold value which is an entry angle threshold value or an exit angle threshold value set in the area, and content information about the target in association with each other; acquiring position information about a user terminal possessed by a user; specifying a movement angle indicating an angle at which the user enters or exits the area, by using the position information about the user terminal; adjusting the angle threshold value when a predetermined condition is satisfied; and controlling provision of content information based on a result of comparison between the specified movement angle with the adjusted angle threshold value. Other examples are as described in the various example embodiments described above. The program is a program for causing the computer to execute the information providing method.

In the above example, the program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (Read Only Memory), CD-R, CD-R/W, DVD (Digital Versatile Disk), BD (Blu-ray (registered trademark) Disk), and semiconductor memories (such as mask ROM, PROM (Programmable ROM), EPROM (Erasable PROM), flash ROM, RAM (Random Access Memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Note that the present disclosure is not limited to the above-described example embodiments, and may be changed as appropriate without departing from the spirit. For example, it is also possible to make the above voice service output acoustic AR voice information for which the sound image localization position is set to the position of the target object by using the sound image localization technique. In general, in the acoustic AR voice information, the voice information processed based on the user's position with respect to the target is output to the hearable device possessed by the user. In the information providing system according to this example embodiment, since the positional relationship between the user position and the position of the target is almost the same when an entry to the geofence is detected, it is possible to output the acoustic AR voice information processed based on the geofence position in advance as it is to the user terminal without processing based on the user position information.

The whole or part of the example embodiments disclosed above can be described as, but not limited to, the following supplementary notes.

(Supplementary Note 1)

An information providing device comprising:

a storage unit configured to store area designation information for designating an area set on a route to a target, an angle threshold value which is an entry angle threshold value or an exit angle threshold value set in the area, and content information about the target in association with each other;

a position information acquisition unit configured to acquire position information about a user terminal possessed by a user;

a movement angle specifying unit configured to specify a movement angle indicating an angle at which the user enters or exits the area, by using the position information about the user terminal;

an adjustment unit configured to adjust the angle threshold value when a predetermined condition is satisfied; and a provision control unit configured to control provision of content information based on a result of comparison between the specified movement angle with the adjusted angle threshold value.

(Supplementary Note 2)

The information providing device according to Supplementary note 1, further comprising:

a time acquisition unit configured to acquire a time when the user enters the area; and an adjustment unit configured to, when the acquired time is the predetermined time period, acquiring an adjustment value corresponding to a predetermined time period, and then adjust the entry angle threshold value according to the adjustment value.

(Supplementary Note 3)

The information providing device according to Supplementary note 1, further comprising:

a time acquisition unit configured to acquire a time when the user exits the area; and an adjustment unit configured to, when the acquired time is the predetermined time period, acquiring an adjustment value corresponding to a predetermined time period, and then adjust the exit angle threshold value according to the adjustment value.

(Supplementary Note 4)

The information providing device according to any one of Supplementary notes 1 to 3, further comprising:

a history information storage unit configured to store identification information about the user terminal, identification information about a plurality of the areas, and the position information about the user terminal in the plurality of areas in association with each other as history information related to a passage route of the user, wherein the provision control unit changes the content information based on the history information.

(Supplementary Note 5)

The information providing device according to any one of Supplementary notes 1 to 3, further comprising:

a history information storage unit configured to store identification information about the user terminal, identification information about a plurality of the areas, position information about the user in the plurality of areas, and content information provided in relation to the plurality of areas in association with each other as history information related to a passage route of the user and a provided content, wherein the provision control unit changes the content information based on the history information.

(Supplementary Note 6)

The information providing device according to any one of Supplementary notes 1 to 5, further comprising:

a direction acquisition unit configured to acquire a direction of the user terminal when the user enters or exits the area, wherein the provision control unit controls the provision of the content information based on the direction of the user terminal and a result of comparison between the specified movement angle and the adjusted angle threshold value.

(Supplementary Note 7)

The information providing device according to Supplementary note 6, wherein the content information is a voice content, and the provision control unit performs sound image localization processing on the voice content based on the direction of the user terminal.

(Supplementary note 8)

The information providing device according to any one of Supplementary notes 1 to 7, wherein the provision control unit determines that the user has entered the area when a predetermined condition is satisfied after the user has entered the area.

(Supplementary Note 9)

The information providing device according to any one of Supplementary notes 1 to 8, wherein the provision control unit determines that the user has exited the area when a predetermined condition is satisfied after the user has exited the area.

(Supplementary note 10)

An information providing system comprising:

a storage unit configured to store area designation information for designating an area set on a route to a target, an angle threshold value which is an entry angle threshold value or an exit angle threshold value set in the area, and content information about the target in association with each other; a user terminal possessed by a user;

a position information acquisition unit configured to acquire position information about the user terminal;

a movement angle specifying unit configured to specify a movement angle indicating an angle at which the user enters or exits the area, by using the position information about the user terminal;

an adjustment unit configured to adjust the angle threshold value when a predetermined condition is satisfied; and a provision control unit configured to control provision of content information based on a result of comparison between the specified movement angle with the adjusted angle threshold value.

(Supplementary Note 11)

The information providing system according to Supplementary note 10, wherein the user terminal includes a direction detection unit configured to detect a direction of the user terminal.

(Supplementary note 12)

An information providing method comprising:

storing area designation information for designating an area set on a route to a target, an angle threshold value which is an entry angle threshold value or an exit angle threshold value set in the area, and content information about the target in association with each other;

acquiring position information about a user terminal possessed by a user;

specifying a movement angle indicating an angle at which the user enters or exits the area, by using the position information about the user terminal;

adjusting the angle threshold value when a predetermined condition is satisfied; and controlling provision of content information based on a result of comparison between the specified movement angle with the adjusted angle threshold value.

(Supplementary note 13)

A non-transitory computer readable medium storing a program for causing a computer to execute processing of:

storing area designation information for designating an area set on a route to a target, an angle threshold value which is an entry angle threshold value or an exit angle threshold value set in the area, and content information about the target in association with each other;

acquiring position information about a user terminal possessed by a user;

specifying a movement angle indicating an angle at which the user enters or exits the area, by using the position information about the user terminal;

adjusting the angle threshold value when a predetermined condition is satisfied; and controlling provision of content information based on a result of comparison between the specified movement angle with the adjusted angle threshold value.

Although the present disclosure has been described with reference to the example embodiments, the disclosure invention is not limited by the above. The configuration and details of the present disclosure may be modified in various ways that will be understood by those skilled in the art within the scope of the disclosure.

This application claims priority on the basis of Japanese Patent Application No. 2020-078945, filed Apr. 28, 2020, the entire disclosure of which is incorporated herein by reference.

REFERENCE SIGNS LIST

1 INFORMATION PROVIDING SYSTEM
5 CURSOR
8 USER
9 USER
10 SERVER
20 USER TERMINAL
30 NETWORK
100 INFORMATION PROVIDING DEVICE
101 CONTROL UNIT
102 STORAGE UNIT
103 ACQUISITION UNIT
400 FACILITY
1011 POSITION INFORMATION ACQUISITION UNIT
1012 MOVEMENT ANGLE SPECIFYING UNIT
1013 DIRECTION ACQUISITION UNIT
1014 ADJUSTMENT UNIT
1015 PROVISION CONTROL UNIT
1016 SOUND IMAGE LOCALIZATION PROCESSING UNIT
1018 TIME ACQUISITION UNIT
1021 MAP INFORMATION DATABASE
1022 REGISTRATION POSITION INFORMATION DATABASE
1023 USER INFORMATION DATABASE
1024 GEOFENCE DATABASE
1025 CONTENT DATABASE
1026 HISTORY INFORMATION DATABASE

What is claimed is:

1. An information providing device comprising:
storage for storing area designation information for designating an area set on a route to a target, an angle threshold value which is an entry angle threshold value or an exit angle threshold value set in the area, and content information about the target in association with each other;
at least one memory storing instructions, and
at least one processor configured to execute the instructions to:
acquire position information about a user terminal possessed by a user;
specify a movement angle indicating an angle at which the user enters or exits the area, by using the position information about the user terminal;
acquire a time when the user enters the area or exits the area;
based on the acquired time satisfying a predetermined time period, acquire an adjustment value corresponding to the predetermined time period, and adjust the entry angle threshold value or the exit angle threshold value according to the adjustment value; and
control provision of content information based on a result of comparison between the specified movement angle with the adjusted entry angle threshold value or the adjusted exit angle threshold value.

2. The information providing device according to claim 1, further comprising:
history information storage for storing identification information about the user terminal, identification information about a plurality of the areas, and the position information about the user terminal in the plurality of areas in association with each other as history information related to a passage route of the user, wherein
wherein the at least one processor is further configured to execute the instructions to; change the content information based on the history information.

3. The information providing device according to claim 1, further comprising:
history information storage for storing identification information about the user terminal, identification information about a plurality of the areas, position information about the user in the plurality of areas, and content information provided in relation to the plurality of areas in association with each other as history information related to a passage route of the user and a provided content, wherein
wherein the at least one processor is further configured to execute the instructions to; change the content information based on the history information.

4. The information providing device according to claim 1, wherein the at least one processor is further configured to execute the instructions to; acquire a direction of the user terminal when the user enters or exits the area; and control the provision of the content information based on the direction of the user terminal and a result of comparison between the specified movement angle and the adjusted angle threshold value.

5. The information providing device according to claim 4, wherein
the content information is a voice content, and
wherein the at least one processor is further configured to execute the instructions to; perform sound image localization processing on the voice content based on the direction of the user terminal.

6. The information providing device according to claim 1, wherein the at least one processor is further configured to execute the instructions to; determine that the user has entered the area when a predetermined condition is satisfied after the user has entered the area.

7. The information providing device according to claim 1, wherein
wherein the at least one processor is further configured to execute the instructions to; determine that the user has exited the area when a predetermined condition is satisfied after the user has exited the area.

8. An information providing method comprising:
storing area designation information for designating an area set on a route to a target, an angle threshold value which is an entry angle threshold value or an exit angle threshold value set in the area, and content information about the target in association with each other;
acquiring position information about a user terminal possessed by a user;
specifying a movement angle indicating an angle at which the user enters or exits the area, by using the position information about the user terminal;
acquiring a time when the user enters the area or exits the area;
based on the acquired time satisfying a predetermined time period, acquiring an adjustment value corresponding to the predetermined time period, and adjusting the entry angle threshold value or the exit angle threshold value according to the adjustment value; and controlling provision of content information based on a result of comparison between the specified movement angle with the adjusted entry angle threshold value or the adjusted exit angle threshold value.

9. A non-transitory computer readable medium storing a program for causing a computer to execute processing of:

storing area designation information for designating an area set on a route to a target, an angle threshold value which is an entry angle threshold value or an exit angle threshold value set in the area, and content information about the target in association with each other;

acquiring position information about a user terminal possessed by a user;

specifying a movement angle indicating an angle at which the user enters or exits the area, by using the position information about the user terminal;

acquiring a time when the user enters the area or exits the area;

based on the acquired time satisfying a predetermined time period, acquiring an adjustment value corresponding to the predetermined time period, and adjusting the entry angle threshold value or the exit angle threshold value according to the adjustment value; and controlling provision of content information based on a result of comparison between the specified movement angle with the adjusted entry angle threshold value or the adjusted exit angle threshold value.

* * * * *